United States Patent
Song et al.

(10) Patent No.: US 12,265,258 B2
(45) Date of Patent: **\*Apr. 1, 2025**

(54) STRUCTURES AND METHODS FOR HIGH SPEED INTERCONNECTION IN PHOTONIC SYSTEMS

(71) Applicant: Taiwan Semiconductor Manufacturing Co., Ltd., Hsin-Chu (TW)

(72) Inventors: Weiwei Song, San Jose, CA (US); Stefan Rusu, Sunnyvale, CA (US); Mohammed Rabiul Islam, Austin, TX (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,338

(22) Filed: Aug. 9, 2023

(65) Prior Publication Data
US 2023/0393337 A1 Dec. 7, 2023

Related U.S. Application Data

(63) Continuation of application No. 18/080,684, filed on Dec. 13, 2022, now Pat. No. 11,808,977, which is a
(Continued)

(51) Int. Cl.
*G02B 6/132* (2006.01)
*G02B 6/12* (2006.01)
(Continued)

(52) U.S. Cl.
CPC ............. *G02B 6/132* (2013.01); *G02B 6/136* (2013.01); *H04B 10/25* (2013.01);
(Continued)

(58) Field of Classification Search
CPC ........ H04B 10/25; G02B 6/136; G02B 6/132; G02B 2006/12038; G02B 2006/12061; G02B 2006/12164
(Continued)

(56) References Cited

U.S. PATENT DOCUMENTS 10,481,419 B1 11/2019 Song et al.
11,175,454 B2 11/2021 Cherchi et al.
(Continued)

FOREIGN PATENT DOCUMENTS

| CN | 105700203 A | * | 6/2016 | ............... G02B 6/12 |
| CN | 111180347 A | * | 5/2020 | ............ H01L 21/561 |
| CN | 111180426 A | * | 5/2020 | ............. H01L 21/50 |

OTHER PUBLICATIONS

Wang et al; (Ultra-multiband absorption enhancement of graphene in a metal-dielectric-graphene sandwich structure covering terahertz to mid-infrared regime ; Jul. 2017; Optics Express; pp. 1-10. (Year: 2017).*

(Continued)

*Primary Examiner* — Amritbir K Sandhu
(74) *Attorney, Agent, or Firm* — Eschweiler & Potashnik, LLC

(57) ABSTRACT

Structures and methods for high speed interconnection in photonic systems are described herein. In one embodiment, a photonic device is disclosed. The photonic device includes: a substrate; a plurality of metal layers on the substrate; a photonic material layer comprising graphene over the plurality of metal layers; and an optical routing layer comprising a waveguide on the photonic material layer.

20 Claims, 25 Drawing Sheets

Related U.S. Application Data continuation of application No. 17/007,743, filed on Aug. 31, 2020, now Pat. No. 11,550,102.

(51) Int. Cl.
*G02B 6/136* (2006.01)
*H04B 10/25* (2013.01)

(52) U.S. Cl.
CPC .............. *G02B 2006/12038* (2013.01); *G02B 2006/12061* (2013.01); *G02B 2006/12164* (2013.01)

(58) Field of Classification Search
USPC ......................................................... 398/115
See application file for complete search history.

(56) References Cited

U.S. PATENT DOCUMENTS

| | | | | |
|---|---|---|---|---|
| 11,314,144 | B2* | 4/2022 | Qasymeh | G02F 1/353 |
| 11,808,977 | B2* | 11/2023 | Song | G02B 6/1225 |
| 2004/0156610 | A1 | 8/2004 | Charlton et al. | |
| 2011/0101438 | A1 | 5/2011 | Yoo et al. | |
| 2015/0372159 | A1* | 12/2015 | Englund | G01J 3/12 |
| | | | | 250/206 |
| 2016/0197111 | A1 | 7/2016 | Coolbaugh et al. | |
| 2017/0082801 | A1* | 3/2017 | Welch | H04B 10/801 |
| 2018/0246350 | A1* | 8/2018 | Ma | G02F 1/011 |
| 2018/0301324 | A1* | 10/2018 | Bayat | H01J 3/021 |
| 2019/0155068 | A1* | 5/2019 | Dalir | G02F 1/025 |
| 2019/0253776 | A1 | 8/2019 | Mazed et al. | |
| 2022/0066099 | A1 | 3/2022 | Song et al. | |
| 2022/0068703 | A1 | 3/2022 | Bao et al. | |

OTHER PUBLICATIONS

Ding et al; Efficient electro-optic modulation in low-loss graphene-plasmonic slot waveguides; Sep. 2017; Royal Society of America; pp. 1-7. (Year: 2017).*

Song et al; Great light absorption enhancement in a graphene photodetector integrated with a metamaterial perfect absorber; Jul. 2013; RSC publishing; pp. 1-5. (Year: 2013).*

Jafari et al ;High bandwidth and responsivity mid-infrared graphene photodetector based on a modified metal-dielectric-graphene architecture; Jul. 2019; Optical society of America; pp. 1-8. (Year: 2019).*

Yue et al; Graphene-based dual-mode modulators; Jun. 2020; Optical Society of America; pp. 1-16. (Year: 2020).

Sun et al; An all-optical modulator based on a graphene-plasmonic slot waveguide at 1550 nm; Mar. 2019; Applied Physics Express; pp. 1-6. (Year: 2019).

Jafari et al; High bandwidth and responsivity mid-infrared graphene photodetector based on a modified metal-dielectric-graphene architecture; Applied Optics vol. 58, No. 23; Aug. 2019; pp. 1-8. (Year: 2019).

Ding et al; Efficient electro-optic modulation in low-loss graphene-plasmonic slot waveguides; Sep. 2017; Royal Society of Chemistry Nanoscale; pp. 1-6. (Year: 2017).

Ding et al; Efficient electro-optic modulation in low-loss graphene-plasmonic slot waveguides; Sep. 2017; Royal Society of Chemistry; pp. 1-7. (Year: 2017).

Wang et al; Ultra-multiband absorption enhancement of graphene in a metal-dielectric-graphene sandwich structure covering terahertz to midi infrared regime, Aug. 2017; Optical society of America; pp. 1-10. (Year: 2017).

Song et al; Great light absorption enhancement in a graphene photodetector integrated with a metamaterial perfect absorber; Aug. 2013; RSC publishing; pp. 1-5. (Year: 2013).

Song et al; Great light absorption enhancement in a graphene photodetector integrated with a metamaterial perfect absorber; Aug. 2013; RSC publishing Nanoscale; pp. 1-6. (Year: 2013).

* cited by examiner

STRUCTURES AND METHODS FOR HIGH SPEED INTERCONNECTION IN PHOTONIC SYSTEMS

CROSS-REFERENCE TO RELATED APPLICATIONS

This application is a continuation of U.S. patent application Ser. No. 18/080,684, filed Dec. 13, 2022, which is a continuation of U.S. patent application Ser. No. 17/007,743, filed Aug. 31, 2020, now U.S. Pat. No. 11,550,102, each of which is incorporated by reference herein in their entireties.

BACKGROUND

Photonic integrated circuits (PICs) integrate various electronic components, e.g. serializer/deserializer (SerDes) circuits, transceivers, clocking circuitry, and/or control circuitry. With the long range SerDes reaching its speed limit, on-chip or in-package optical input/output (I/O) circuits are taken as the most promising candidates to further boost the speed.

Conventionally, silicon photonics based on a silicon on insulator (SOI) platform or substrate are used to achieve high speed optical I/O, which induces a relatively thick crystal silicon layer and a thick oxide layer. In addition, the SOI platform is not commonly used for electronic chip fabrication, which makes it impossible to monolithically integrate high performance photonic and electronic circuits together. Even for the electronic chips based on SOI, the SOI wafer specifications are significantly different from those of the silicon photonics wafers.

Special fabrication processes, such as high temperature annealing and epitaxial growth, are typically needed to fabricate fundamental photonic elements, such as modulators and photodetectors, for the SOI-based silicon photonics. These high temperature processes may ruin the electrical properties of the electronic devices, which makes it incompatible with the electronic chip fabrication. The cost of a SOI-based silicon photonic chip is high. A nitride/oxide-based platform, on the other hand, can only be used as passive and low-speed applications.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

To achieve a high speed optical interconnection between photonic elements, the present teaching discloses a photonic device package including: patterned passive routing structures based on a low-temperature deposited material, e.g. silicon nitride, and high speed active structures, e.g. modulators and photodetectors, based on graphene or other two-dimensional (2D) photonic materials. The photonic device package is formed based on a bulk silicon wafer process, which leads to a lower cost and makes it possible to be integrated to all the technology nodes. A sufficient optical isolation, e.g. larger than 1 micrometer separation, is on the top metal routing layers. Because the photonic materials and elements are deposited or transferred at low temperatures, the disclosed process flow is compatible with a standard complementary metal oxide semiconductor (CMOS) process.

The disclosed high speed interconnection system and its fabrication process are flexible compared to a standard SOI platform, which always starts with an expensive SOI wafer where all critical elements are on the SOI layer. In the disclosed system, the photonic layer can be organic or inorganic, and can be placed anywhere on the vertical direction (perpendicular to the wafer surface) with an optical isolation from the high-index metal layers. The disclosed system monolithically integrates high performance photonic and electronic circuits together without a need of hybrid bonding or stacking of a photonic chip to an electronic chip.

Due to the strong opto-electrical tuning coefficients (in terms of both refractive index and absorption), the disclosed device and system are ultra-compact and power efficient. An optical communication system based on the disclosed photonic devices can be built without a thermal tuning, which boosts the power efficiency with a broadband response, covering all the commonly used O-band, C-band, L-band, etc.

Figure 1A:
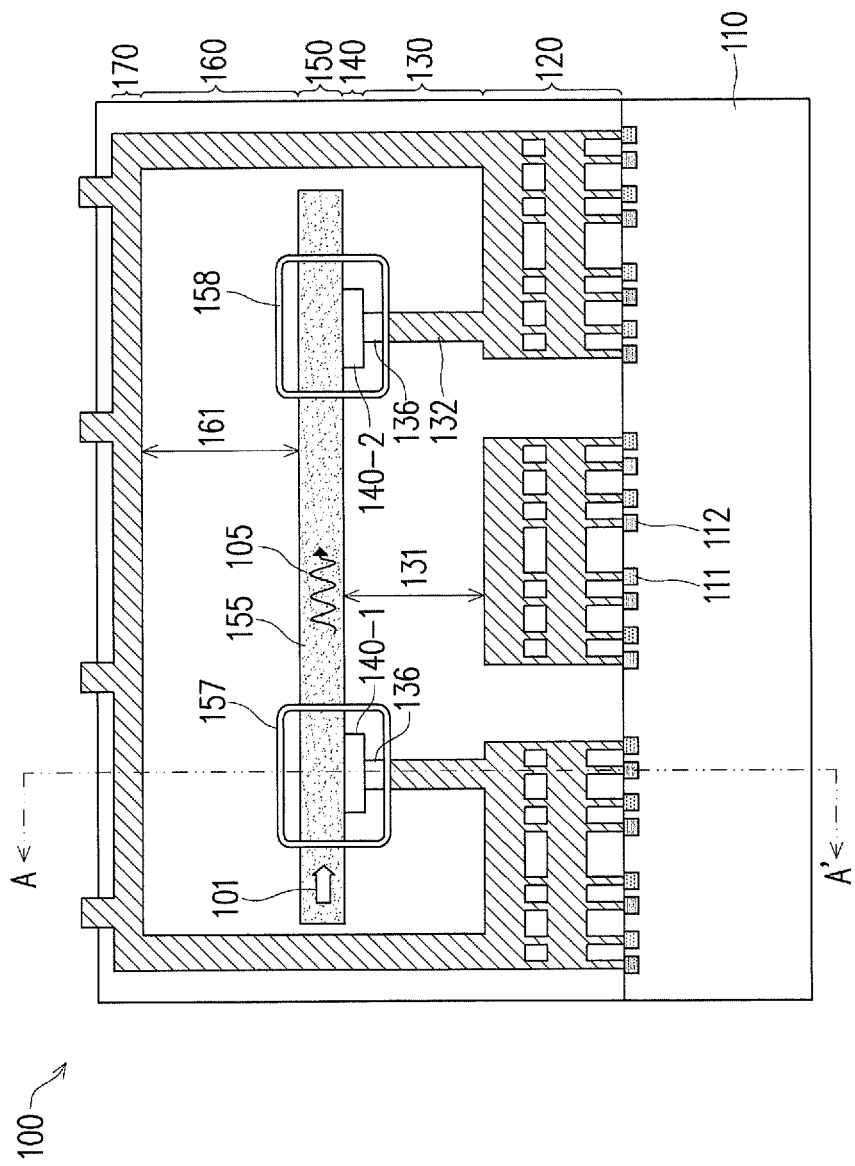
FIG. 1A illustrates a cross-sectional view of an exemplary photonic device, in accordance with some embodiments of present disclosure.

FIG. 1A illustrates a cross-sectional view of an exemplary photonic device 100, in accordance with some embodiments of present disclosure. It is noted that the photonic device 100 is merely an example, and is not intended to limit the present disclosure. Accordingly, it is understood that additional functional blocks may be provided in or coupled to the photonic device 100 of FIG. 1A, and that some other functional blocks may only be briefly described herein.

Referring to FIG. 1A, the photonic device 100 comprises: a substrate 110; a plurality of metal layers 120 on the substrate 110; a photonic material layer 140 over the plurality of metal layers 120; and an optical routing layer 150 comprising a waveguide 155 on the photonic material layer 140. In one embodiment, the substrate 110 is made of bulk silicon. As shown in FIG. 1A, the substrate 110 may comprise implantation regions 111, 112 with dopants. For example, each of the implantation regions 111 is doped with a p-type material; while each of the implantation regions 112 is doped with an n-type material.

As shown in FIG. 1A, the photonic device 100 further comprises an optical isolation layer 130 on the plurality of metal layers 120. In one embodiment, the optical isolation layer 130 comprises a relatively thick low refractive index material, e.g. silicon oxide with a thickness 131 of at least one micrometer, to isolate the optical routing in the waveguide 155 or a wavelength division multiplexing (WDM) of the optical routing layer 150 from the leaky lossy materials in the plurality of metal layers 120.

As shown in FIG. 1A, the photonic device 100 further comprises a plurality of metal vias 132 extending through the optical isolation layer 130 and onto the plurality of metal layers 120. As shown in FIG. 1A, the photonic device 100 further comprises a contact layer 136 comprising a plurality of contacts each of which is formed on and in contact with a corresponding one of the plurality of metal vias 132. The photonic material layer 140 is formed on and in contact with the contact layer 136. In accordance with various embodiments, each of the plurality of contacts 136 comprises at least one of: nickel, palladium, or chromium.

The waveguide 155 in the optical routing layer 150 may include a passive optical routing material, such as silicon nitride, polycrystalline silicon, etc., which is deposited and patterned to guide a light 101 or electromagnetic wave 105. In one embodiment, the waveguide 155 and the photonic material layer 140 form various photonic elements, e.g. a modulator 157 or a photodetector 158. In accordance with various embodiments, the photonic material layer 140 comprises a plurality of photonic material regions 140-1, 140-2 distributed in the photonic elements 157, 158 respectively. In accordance with various embodiments, different photonic material regions 140-1, 140-2 may include same or different sublayers, e.g. at least one graphene sublayer comprising graphene, and at least one dielectric sublayer comprising a dielectric material.

In one embodiment, before the patterning of the optical routing structures in the optical routing layer 150, 2D photonic materials, such as graphene, are deposited or transferred to the top of the wafer and patterned in the photonic material layer 140. This material, by properly electrical biasing and optical mode overlapping with the light guiding structure in the optical routing layer 150, can be used to realize high speed optical signal modulation and detection.

As shown in FIG. 1A, the photonic device 100 further comprises an optical cladding layer 160 on the optical routing layer 150; and a top metal routing layer 170 on the optical cladding layer 160. In accordance with various embodiments, the optical cladding layer 160 comprises a relatively thick low refractive index material, e.g. silicon oxide with a thickness 161 of at least one micrometer, to isolate the optical routing in the waveguide 155 or a wavelength division multiplexing (WDM) of the optical routing layer 150 from the leaky lossy materials in the top metal routing layer 170. In one embodiment, the top metal routing layer 170 may include or serve as a power distribution layer.

Figure 1B:
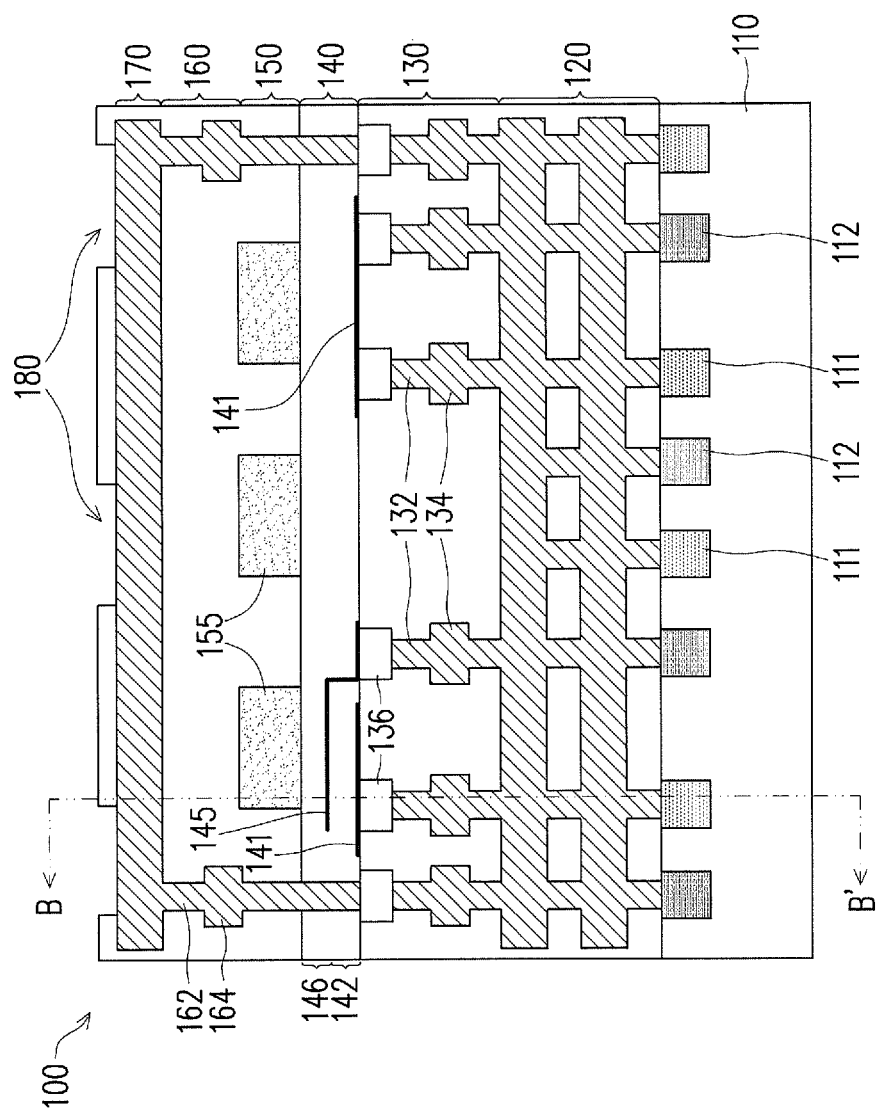
FIG. 1B illustrates another cross-sectional view of the exemplary photonic device in FIG. 1A, in accordance with some embodiments of present disclosure.

FIG. 1B illustrates another cross-sectional view of the exemplary photonic device 100 in FIG. 1A, in accordance with some embodiments of present disclosure. The cross-sectional view of the photonic device 100 in FIG. 1A is taken along the B-B' direction as shown in FIG. 1B. The cross-sectional view of the photonic device 100 in FIG. 1B is taken along the A-A' direction as shown in FIG. 1A. As shown in FIG. 1B, the photonic device 100 comprises: a substrate 110; a plurality of metal layers 120 on the substrate 110; a photonic material layer 140 over the plurality of metal layers 120; and an optical routing layer 150 comprising waveguides 155 on the photonic material layer 140. In one embodiment, the substrate 110 is made of bulk silicon and comprises implantation regions 111, 112 with dopants.

As shown in FIG. 1B, the photonic device 100 comprises a plurality of metal vias 132 extending through the optical isolation layer 130 and onto the plurality of metal layers 120. Each of the plurality of metal vias 132 comprises at least one inter-level metal layer 134 over the plurality of metal layers 120, to ease the via process for metal layer-to-layer connection.

As shown in FIG. 1B, the photonic device 100 further comprises a plurality of metal vias 162 extending through the optical cladding layer 160, the optical routing layer 150, the photonic material layer 140, and onto contacts 136 in the contact layer. Each of the plurality of metal vias 162 comprises at least one inter-level metal layer 164, to ease the via process for metal layer-to-layer connection. As shown in FIG. 1B, the photonic device 100 further comprises some contact openings 180 on the top metal routing layer 170.

As shown in FIG. 1B, the photonic material layer 140 includes a plurality of sublayers, e.g. a first graphene sublayer 141 comprising graphene, a first dielectric sublayer 142 comprising a first dielectric material on the first graphene sublayer 141, a second graphene sublayer 145 comprising graphene on the first dielectric sublayer 142, and a second dielectric sublayer 146 comprising a second dielectric material on the second graphene sublayer 145. Each of the first dielectric material and the second dielectric material may be: aluminum oxide, silicon nitride, or silicon oxide. In one embodiment, the optical routing material in the waveguides 155 is the same as the first dielectric material and the second dielectric material, e.g. silicon nitride.

As shown in FIG. 1B, each of the first graphene sublayer 141 and the second graphene sublayer 145 is on and in contact with a contact 136, while the first graphene sublayer 141 and the second graphene sublayer 145 are electrically isolated by the first dielectric sublayer 142. Depending on different functions of different electronic elements, the second graphene sublayer 145 is distributed in some electronic elements but not others.

In the example shown in FIG. 1B, the photonic material layer 140 comprises graphene located below a bottom surface of at least one of the plurality of waveguides 155. In other embodiments of the present teaching, the photonic material layer 140 comprises graphene located within, e.g. at a center of, at least one of the plurality of waveguides.

Figure 2A:
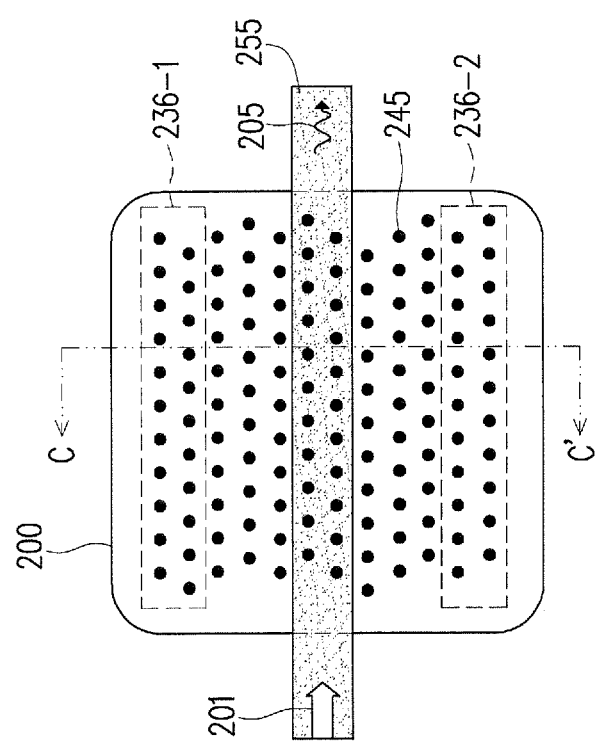
FIG. 2A illustrates a top view of an exemplary photonic device element, in accordance with some embodiments of present disclosure.

FIG. 2A illustrates a top view of an exemplary photonic device element 200, in accordance with some embodiments of present disclosure. In one embodiment, the photonic device element 200 is a component, e.g. a modulator, in a photonic device 100 as shown in FIG. 1A and FIG. 1B.

As shown in FIG. 2A, the photonic device element 200 comprises a waveguide 255 on top of a photonic material layer comprising graphene 245 on two contacts 236-1, 236-2. Each of the two contacts 236-1, 236-2 has a band or rectangular shape. The two contacts 236-1, 236-2 are located in parallel below the graphene 245.

Figure 2B:
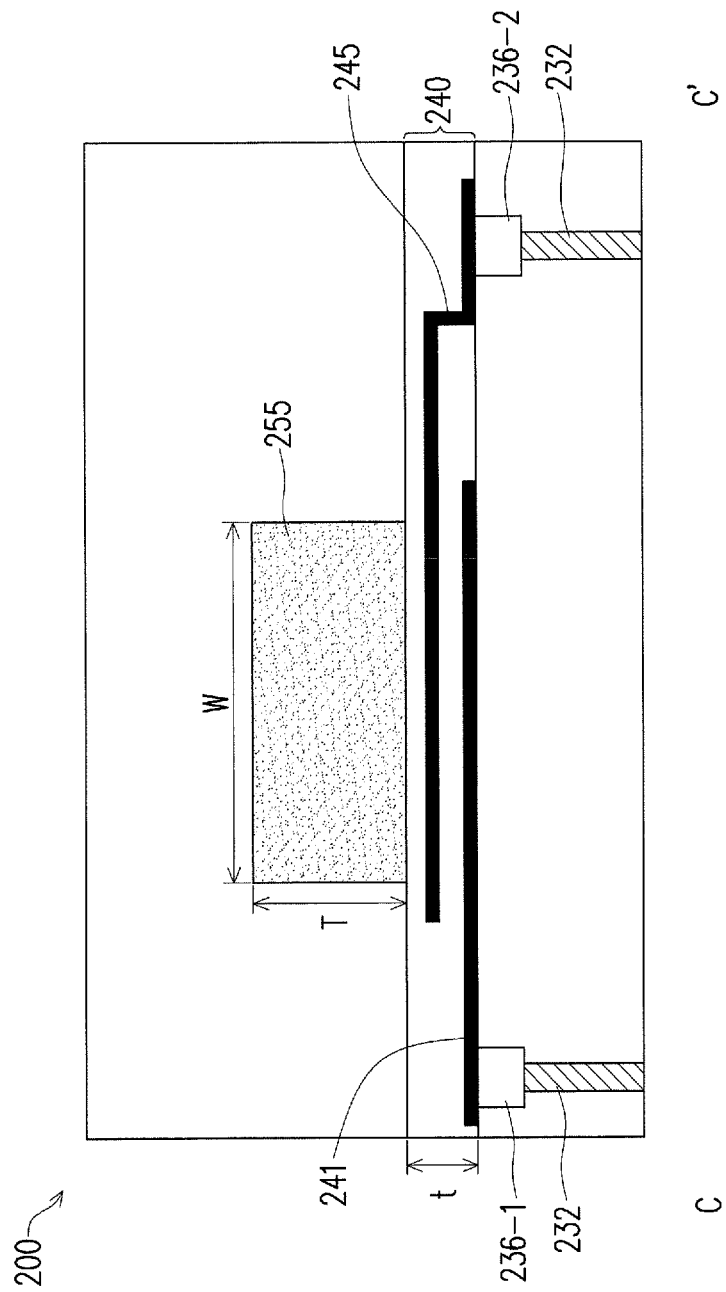
FIG. 2B illustrates a cross-sectional view of the exemplary photonic device element in FIG. 2A, in accordance with some embodiments of present disclosure.

FIG. 2B illustrates a cross-sectional view of the exemplary photonic device element 200 in FIG. 2A, in accordance with some embodiments of present disclosure. The cross-sectional view of the photonic device element 200 in FIG. 2B is taken along the C-C' direction as shown in FIG. 2A.

As shown in FIG. 2B, the photonic device element 200 comprises a waveguide 255 on top of a photonic material layer 240 on and in contact with two contacts 236-1, 236-2. Each of the two contacts 236-1, 236-2 is located on a metal via 232.

As shown in FIG. 2B, the photonic material layer 240 includes two graphene sublayers 241, 245, each of which includes graphene on and in contact with a corresponding one of the contacts 236-1, 236-2. The graphene sublayer 241 is on and in contact with the contact 236-1. A part of the graphene sublayer 245 is on and in contact with the contact 236-2; while another part of the graphene sublayer 245 is over the graphene sublayer 241 and separated from the graphene sublayer 241 by a dielectric material, e.g. aluminum oxide, silicon nitride, or silicon oxide. In one embodiment, the two graphene sublayers 241, 245 may serve as two electrodes in the modulator 200.

In accordance with various embodiments, each of the two graphene sublayers 241, 245 has a thickness of about 0.3 nanometer, which is a thickness of a single carbon atom. In accordance with various embodiments, the waveguide 255 has a thickness T between 400 nanometers and 800 nanometers, and has a width W between 500 nanometers and 2000 nanometers. In accordance with various embodiments, the photonic material layer 240 including the dielectric material has a total thickness t between 5 nanometers and 100 nanometers.

Referring back to FIG. 2A, the photonic device element 200 may receive an input of a continuous wave light 201, which may be a light with a single wavelength from a laser. Based on the continuous wave light 201, the photonic device element 200 may convert electrical signals into optical signals to perform signal modulation; process the optical signals; and send the optical signals 205 out via the waveguide 255. The electrical signals may come from metal layers below the photonic material layer 240 via the contacts 236-1, 236-2, and the graphene sublayers 241, 245.

Figure 3A:
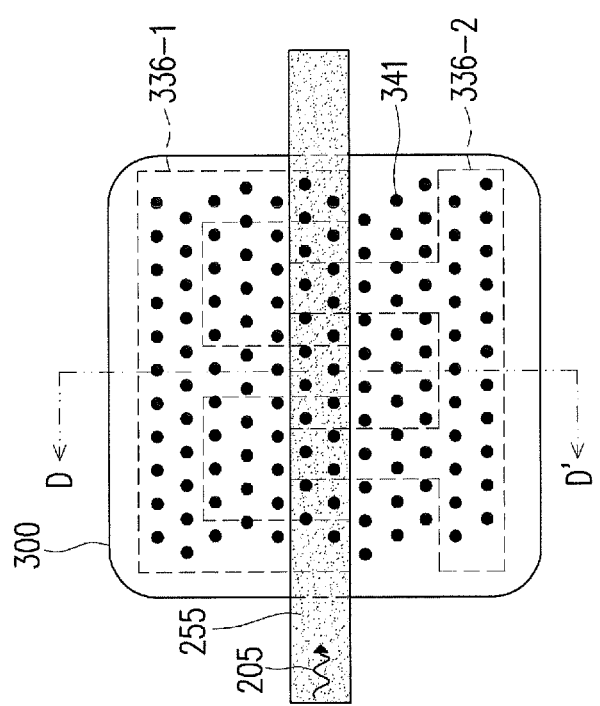
FIG. 3A illustrates a top view of another exemplary photonic device element, in accordance with some embodiments of present disclosure.

FIG. 3A illustrates a top view of another exemplary photonic device element 300, in accordance with some embodiments of present disclosure. In one embodiment, the photonic device element 300 is a component, e.g. a photodetector, in a photonic device 100 as shown in FIG. 1A and FIG. 1B.

As shown in FIG. 3A, the photonic device element 300 comprises a waveguide 255 on top of a photonic material layer comprising graphene 341 on two contacts 336-1, 336-2. Each of the two contacts 336-1, 336-2 has a base portion and multiple finger branches connected to the base portion. The base portions of the two contacts 336-1, 336-2 are located in parallel below the graphene 341. The finger branches of the two contacts 336-1, 336-2 are interlaced and placed in parallel below the graphene 341.

Figure 3B:
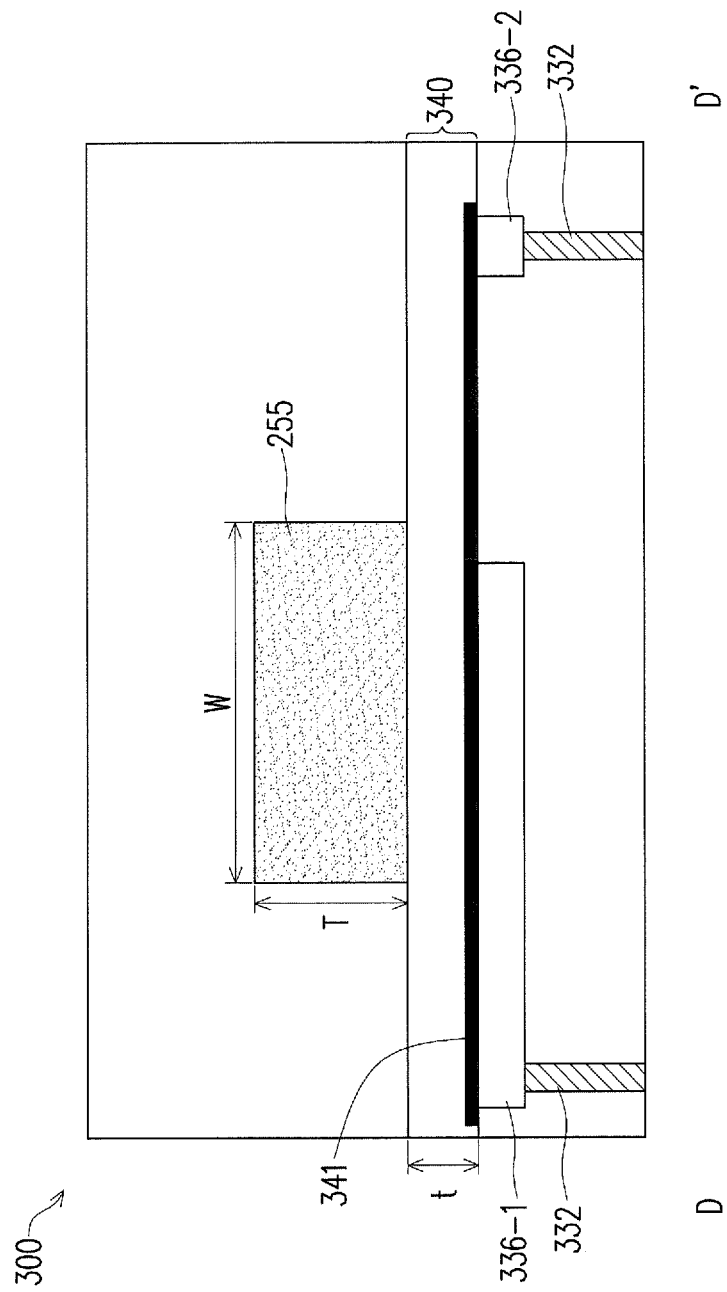
FIG. 3B illustrates a cross-sectional view of the exemplary photonic device element in FIG. 3A, in accordance with some embodiments of present disclosure.

FIG. 3B illustrates a cross-sectional view of the exemplary photonic device element 300 in FIG. 3A, in accordance with some embodiments of present disclosure. The cross-sectional view of the photonic device element 300 in FIG. 3B is taken along the D-D' direction as shown in FIG. 3A.

As shown in FIG. 3B, the photonic device element 300 comprises a waveguide 255 on top of a photonic material layer 340 on and in contact with the two contacts 336-1, 336-2. Each of the two contacts 336-1, 336-2 is located on a metal via 332.

As shown in FIG. 3B, the photonic material layer 340 comprises a graphene sublayer 341 including graphene on and in contact with the contacts 336-1, 336-2. The photonic material layer 340 further comprises a dielectric material, e.g. aluminum oxide, silicon nitride, or silicon oxide, on the graphene sublayer 341.

In accordance with various embodiments, the graphene sublayer 341 has a thickness of about 0.3 nanometer, which is a thickness of a single carbon atom. In accordance with various embodiments, the waveguide 255 has a thickness T between 400 nanometers and 800 nanometers, and has a width W between 500 nanometers and 2000 nanometers. In accordance with various embodiments, the photonic material layer 340 including the dielectric material has a total thickness t between 5 nanometers and 100 nanometers.

In one embodiment, the waveguide 255 in FIG. 2A and FIG. 3A is a same waveguide. The photonic device element 300 may receive the optical signals 205 from the photonic device element 200; process the optical signals 205; convert the optical signals 205 into electrical signals; and send the electrical signals down to the metal layers below the photonic material layer 340 via the graphene sublayer 341 and the contacts 336-1, 336-2.

In one embodiment, a unified material, e.g. silicon nitride, is used for all the devices used in the photonic interconnect system, including modulators, photodetectors, passive routing structures. On device level, the graphene contacts 236-1, 236-2 are put on the bottom surface of the modulator and photodetector to simply the process. In accordance with various embodiments, the graphene sublayer is in contact with or put into the waveguide structure of the modulator and photodetector, which can further boost the device performance.

Figure 4A:
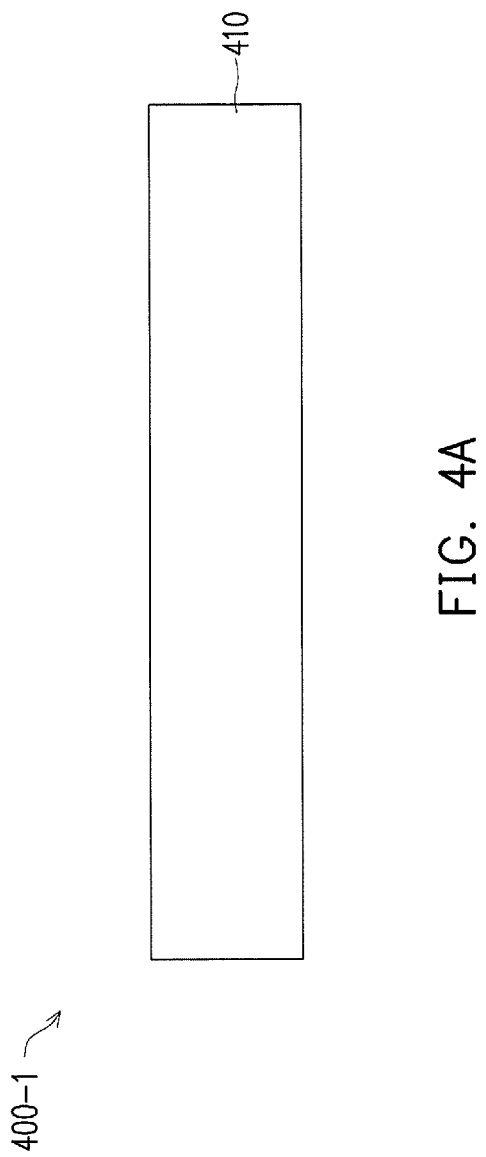
FIGS. 4A-4P illustrate cross-sectional views of an exemplary photonic device at various stages of a fabrication process, in accordance with some embodiments of the present disclosure.
Figure 4B:
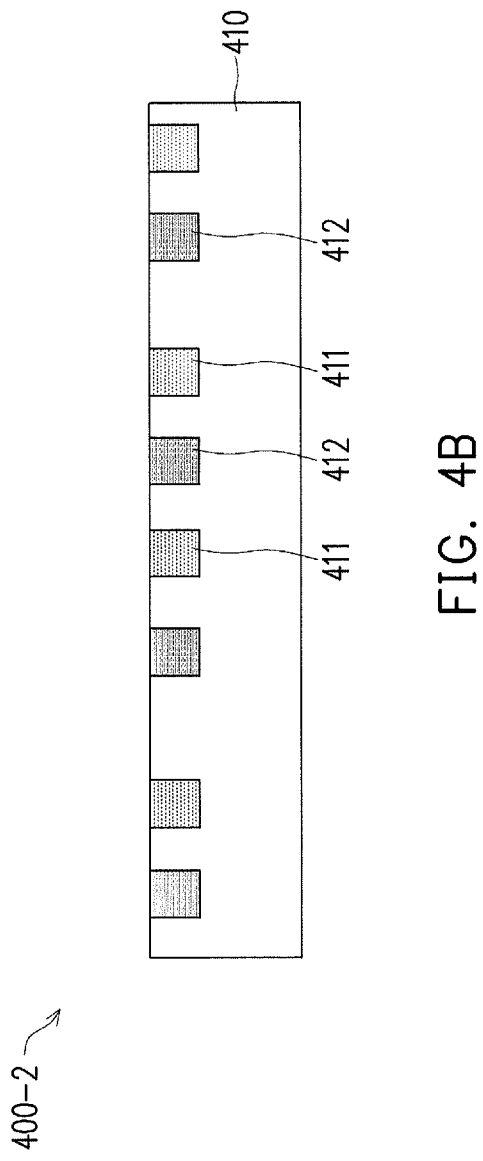
Figure 4C:
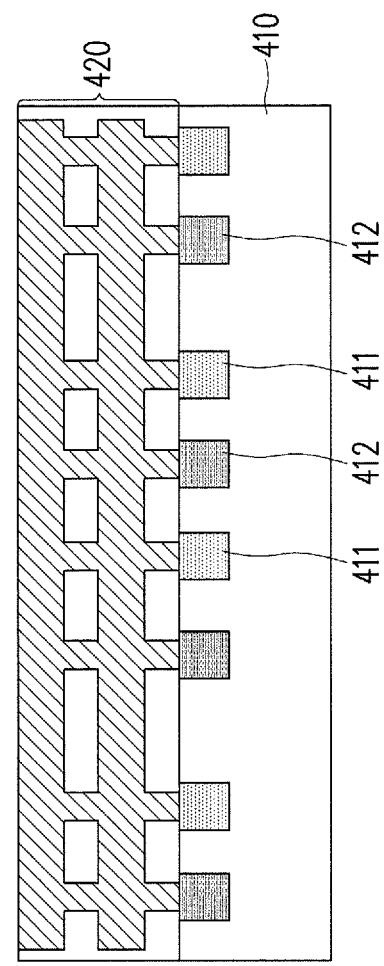
Figure 4D:
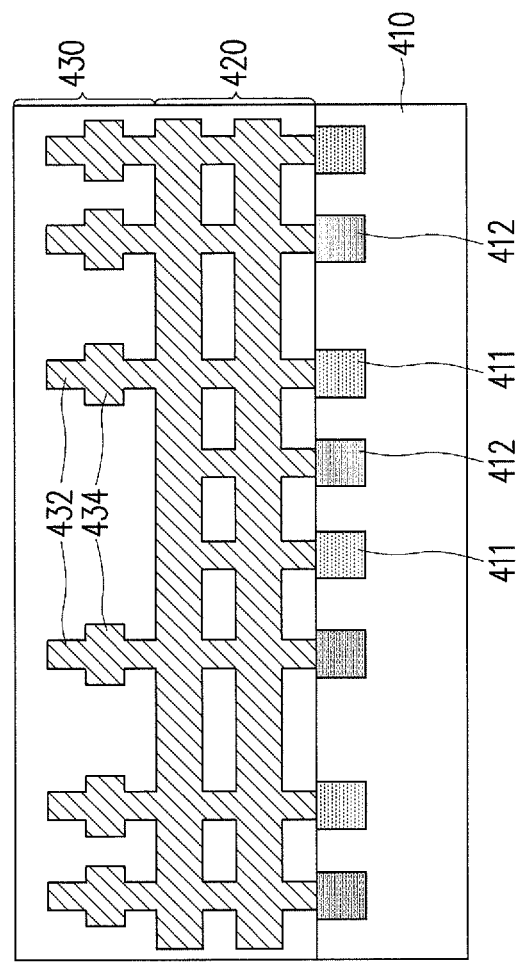
Figure 4E:
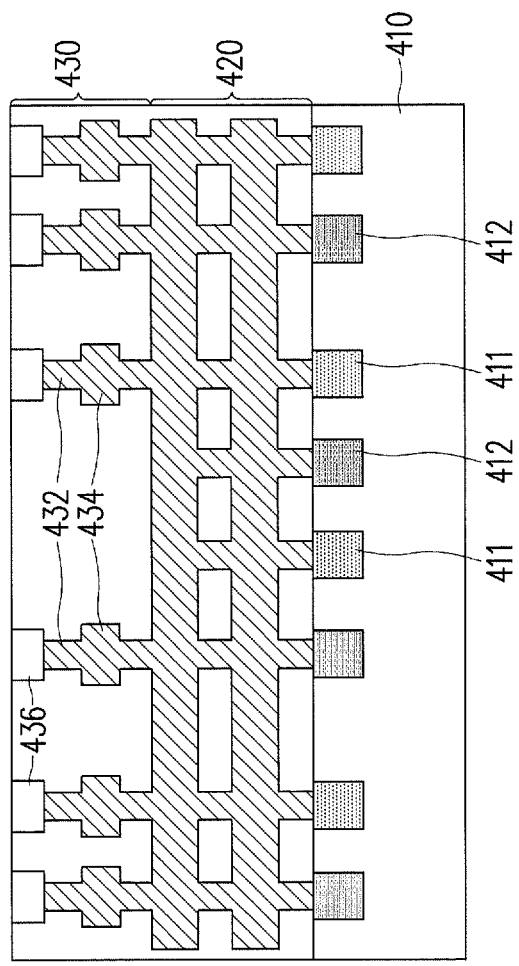
Figure 4F:
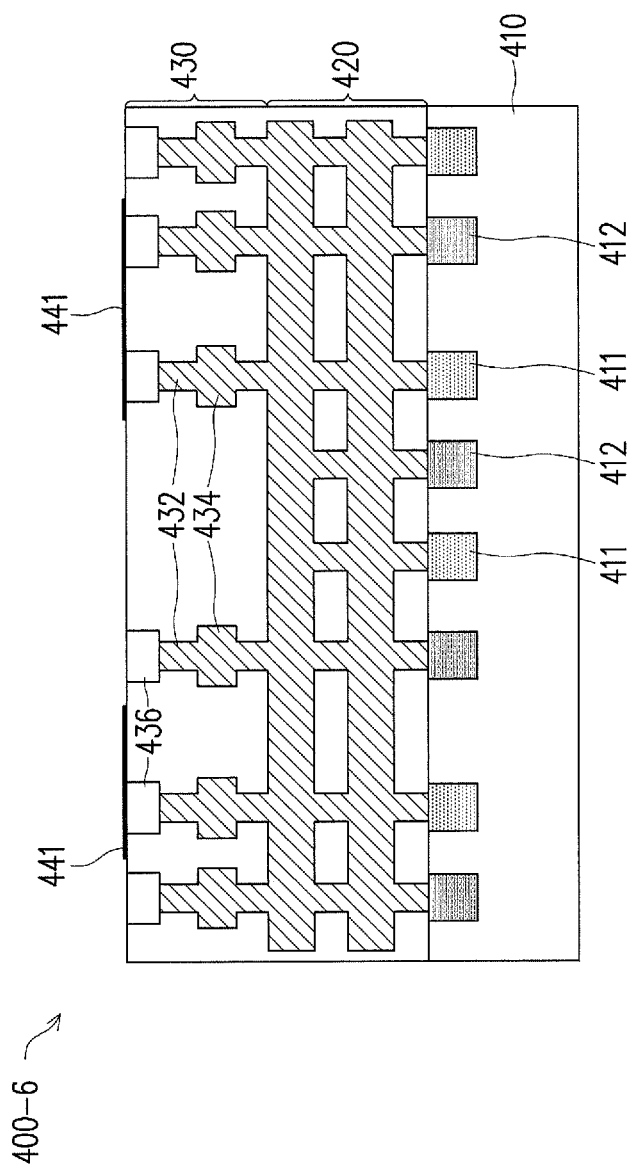
Figure 4G:
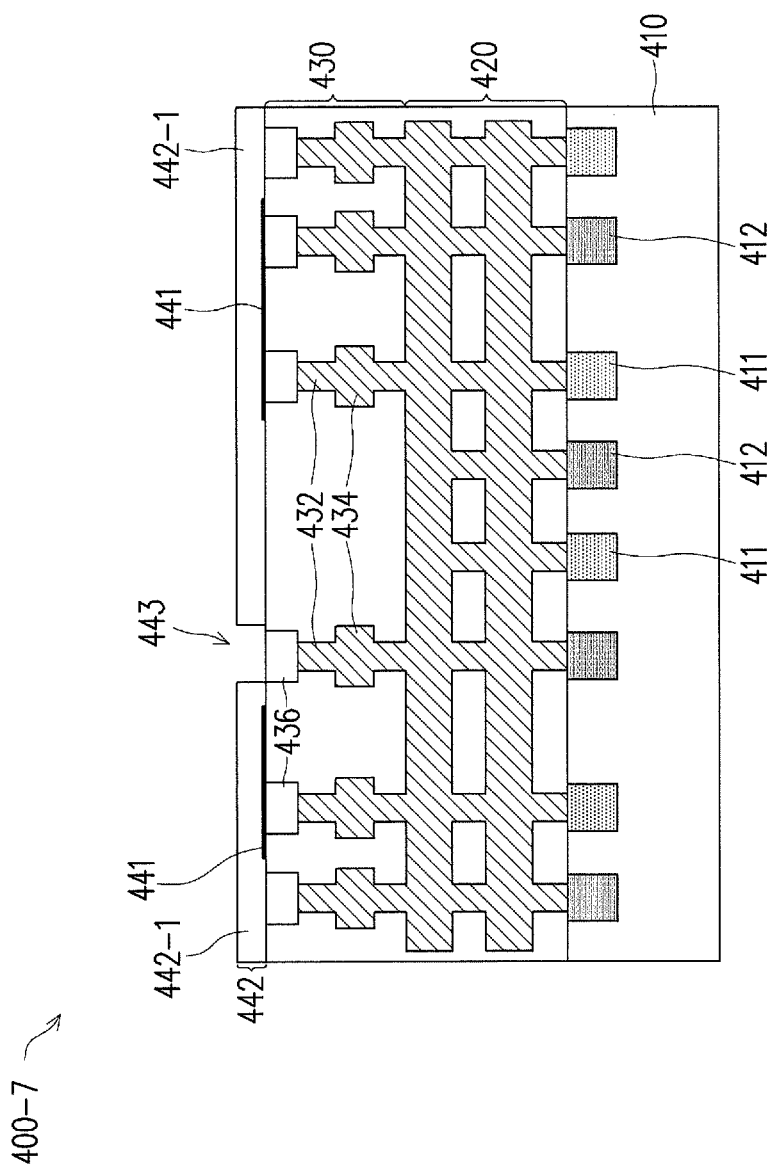
Figure 4H:
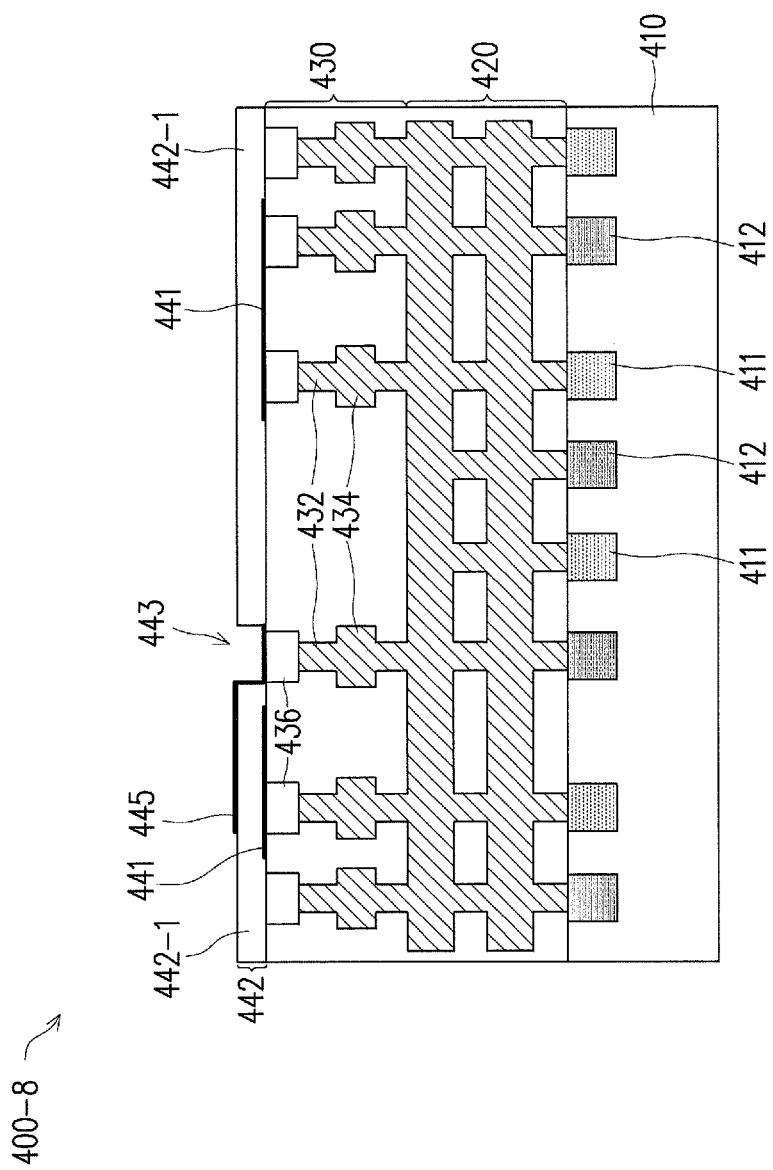
Figure 4I:
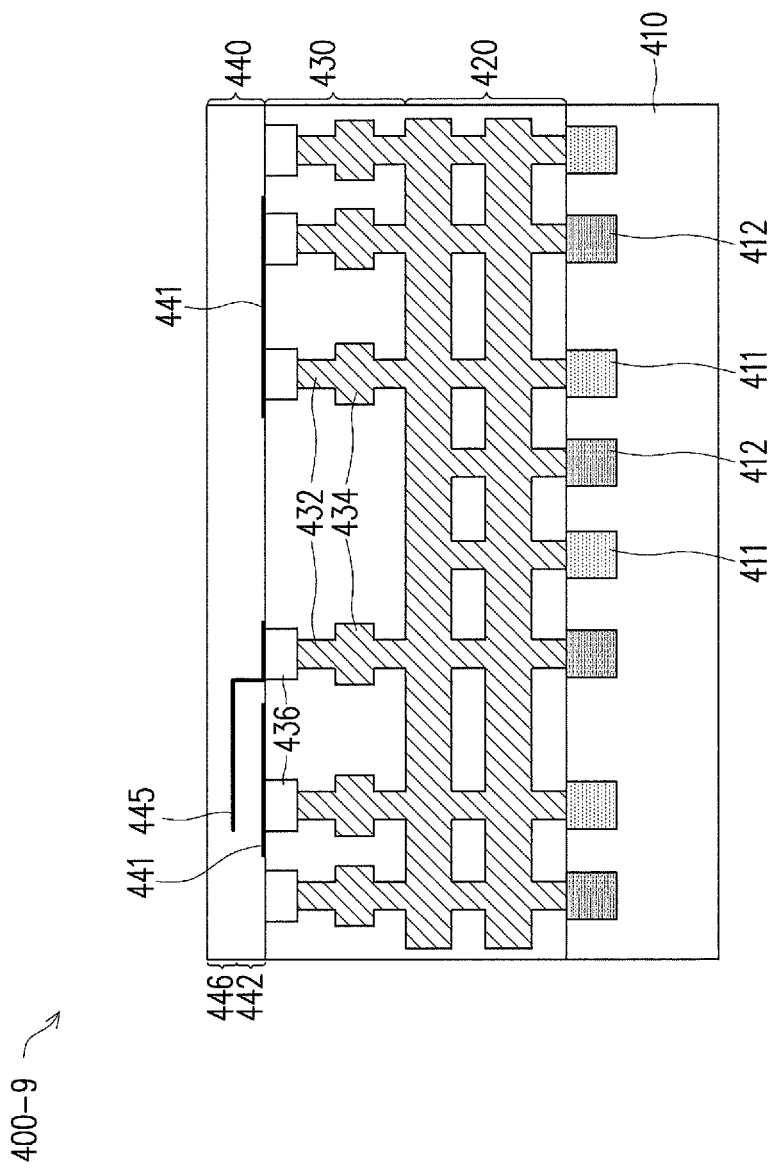
Figure 4J:
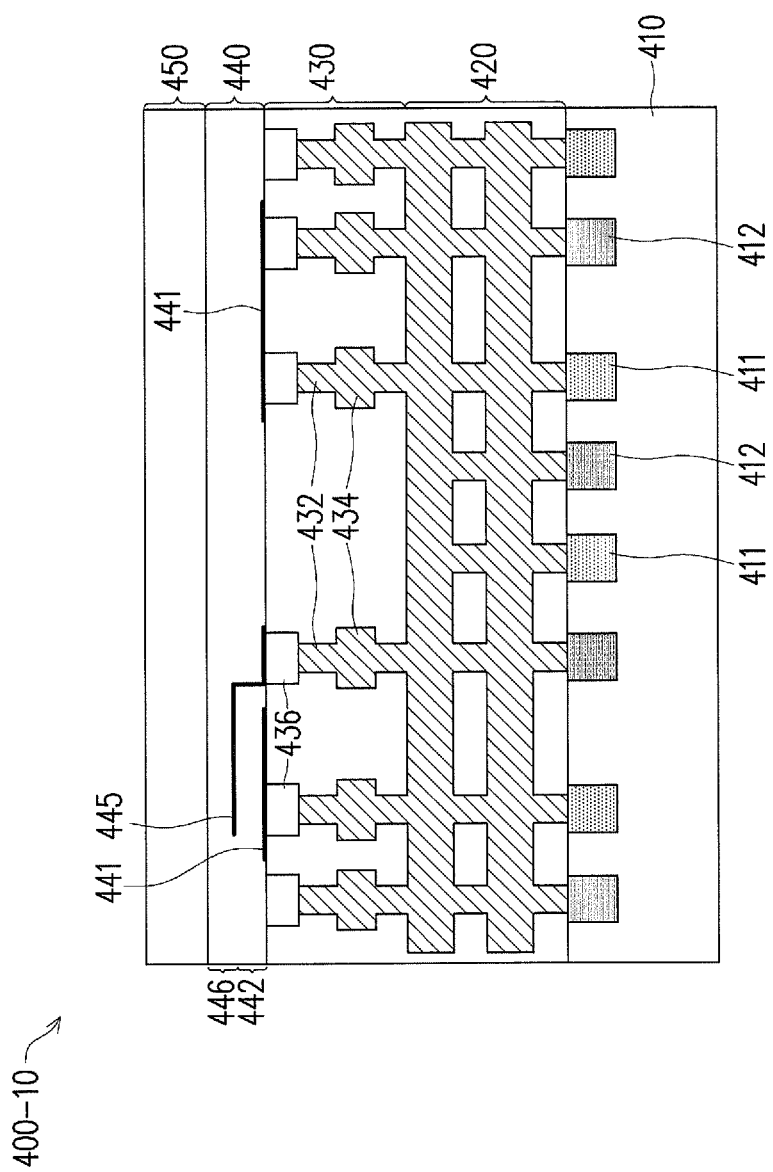
Figure 4K:
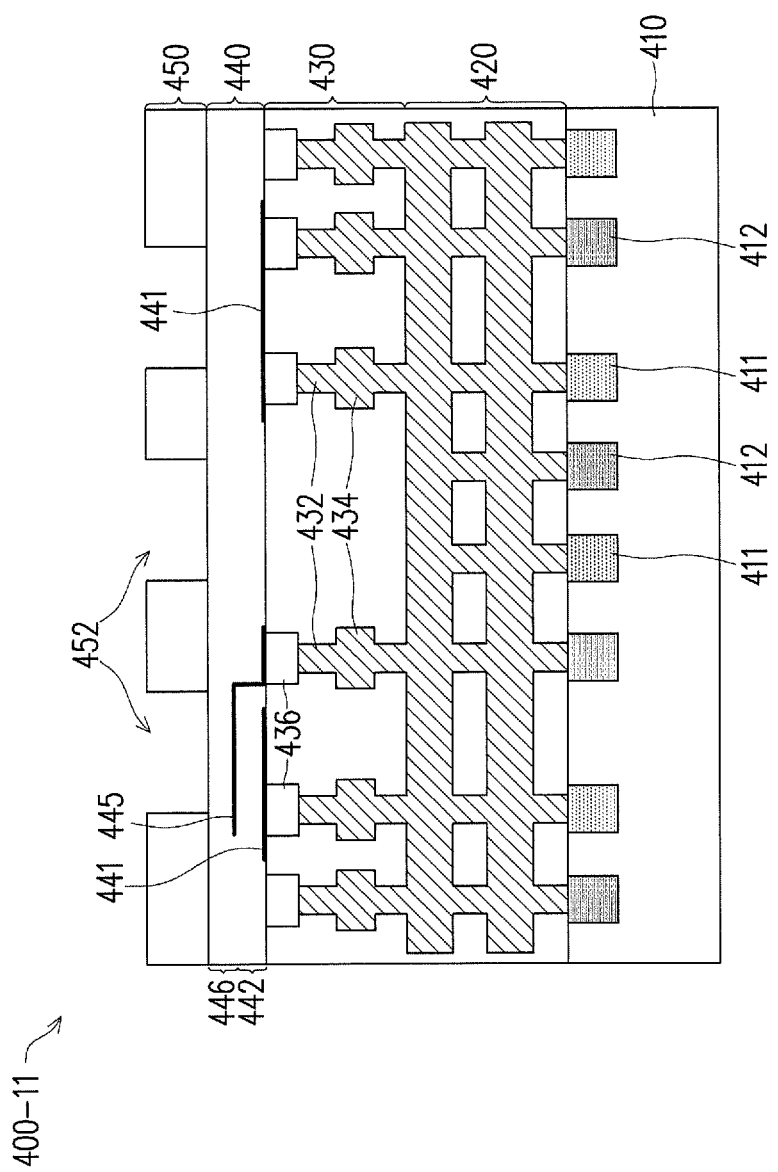
Figure 4L:
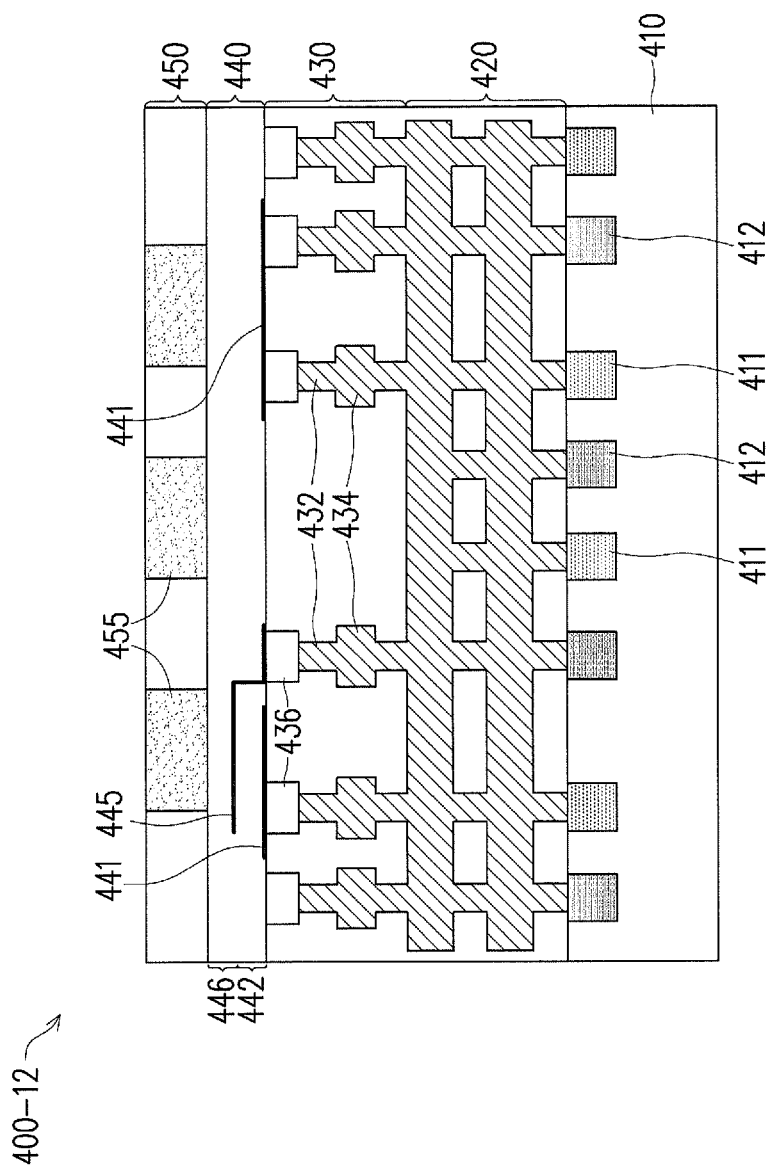
Figure 4M:
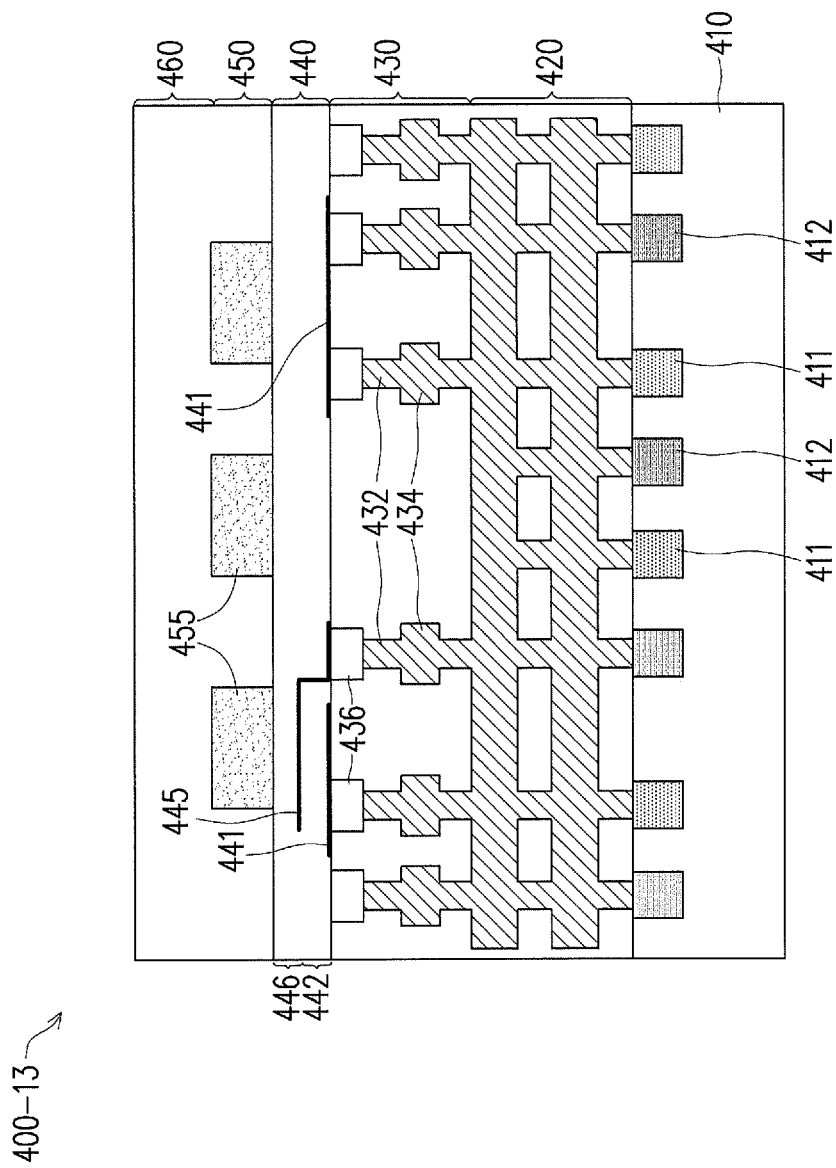
Figure 4N:
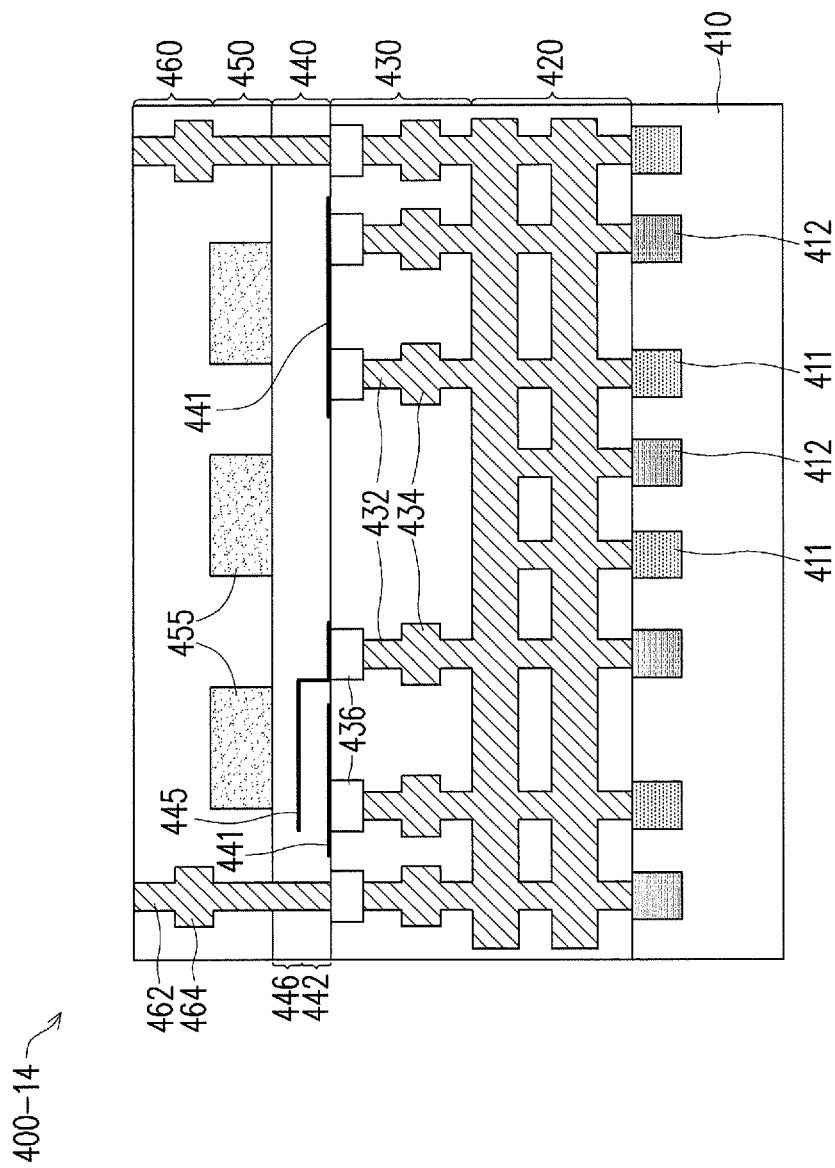
Figure 40:
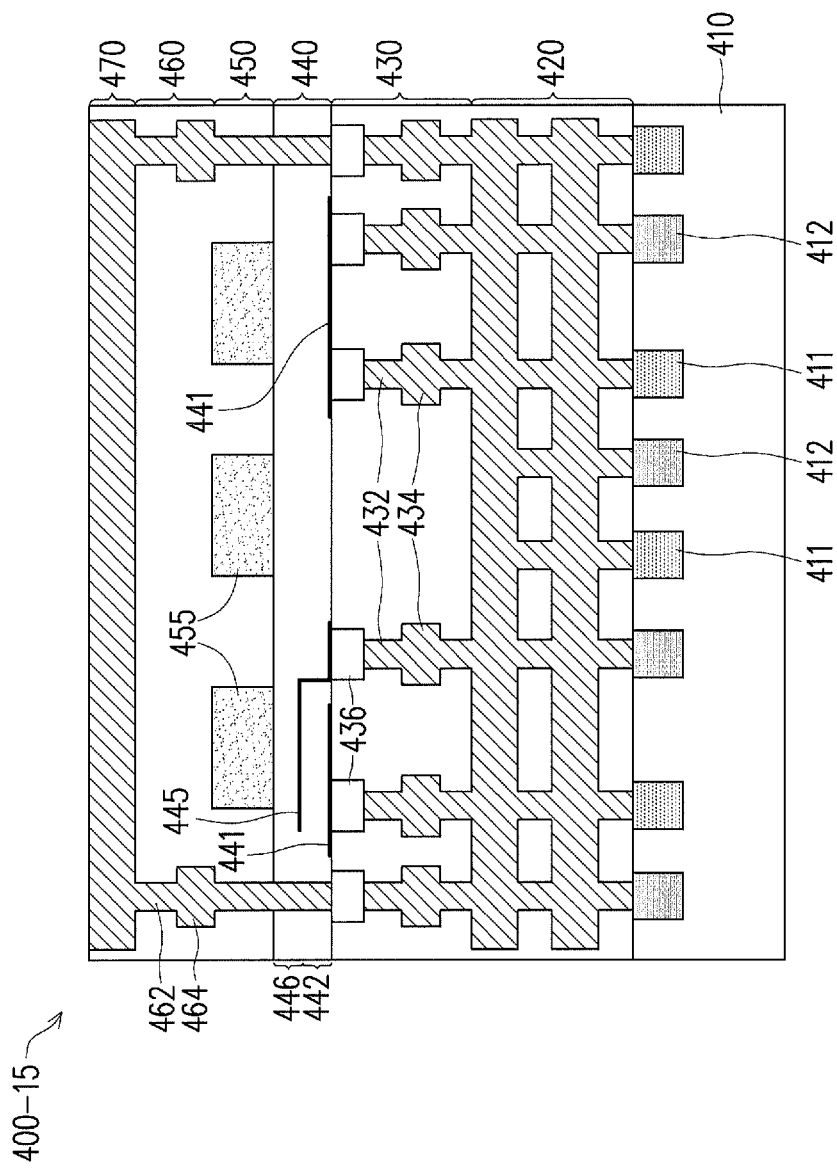
Figure 4P:
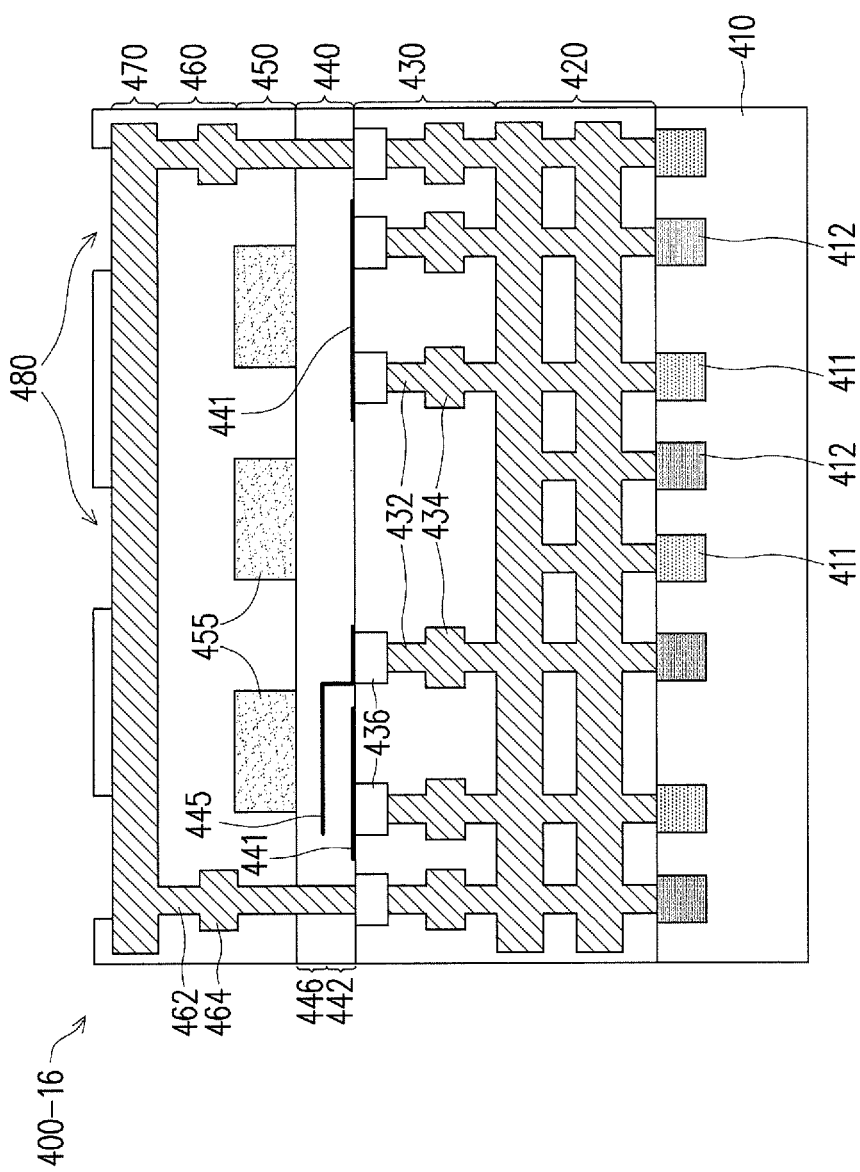

FIGS. 4A-4P illustrate cross-sectional views of an exemplary photonic device at various stages of a fabrication process, in accordance with some embodiments of the present disclosure. FIG. 4A is a cross-sectional view of the photonic device 400-1 including a substrate 410, at one of the various stages of fabrication, according to some embodiments of the present disclosure. The substrate 410 may be formed of bulk silicon.

FIG. 4B is a cross-sectional view of the photonic device 400-2 including implantation regions 411, 412 with dopants formed in the substrate 410, at one of the various stages of fabrication, according to some embodiments of the present disclosure. For example, each of the implantation regions 411 is doped with a p-type material; while each of the implantation regions 412 is doped with an n-type material. The implantation regions 411 may be formed by: defining a first geometric pattern from a photomask to the substrate 410 based on photolithography; and doping, according to the first geometric pattern, a p-type material into the substrate 410 to form the implantation regions 411. The implantation regions 412 may be formed by: defining a second geometric pattern from a photomask to the substrate 410 based on photolithography; and doping, according to the second geometric pattern, an n-type material into the substrate 410 to form the implantation regions 412.

FIG. 4C is a cross-sectional view of the photonic device 400-3 including a plurality of metal layers 420 on the substrate 410, at one of the various stages of fabrication, according to some embodiments of the present disclosure. The plurality of metal layers 420 may be formed by depositing a metal material like copper, aluminum, silver, etc.

FIG. 4D is a cross-sectional view of the photonic device 400-4 including an optical isolation layer 430 and a plurality of metal vias 432 formed in the optical isolation layer 430, at one of the various stages of fabrication, according to some embodiments of the present disclosure. The optical isolation layer 430 may be formed by depositing an optical isolation material with a thickness of at least one micrometer on the plurality of metal layers 420. In various embodiments, different low refractive index materials can be used as the optical isolation material, where one example is silicon oxide. The plurality of metal vias 432 may be formed by: etching the optical isolation layer 430 to form etched regions with a pattern; depositing a metal material, according to the pattern, into the etched regions to form the plurality of metal vias 432 extending through the optical isolation layer 430 and onto the plurality of metal layers 420. Each of the plurality of metal vias 432 may be formed by multiple sub-stages, with an inter-level metal layer 434 formed between two adjacent sub-stages.

FIG. 4E is a cross-sectional view of the photonic device 400-5 including a contact layer comprising a plurality of metal contacts 436 formed in the optical isolation layer 430, at one of the various stages of fabrication, according to some embodiments of the present disclosure. Each of the plurality of metal contacts 436 may be formed by: defining a pattern based on the plurality of metal vias; depositing, according to the pattern, a metal material on and in contact with a corresponding one of the plurality of metal vias 432; and polishing the contacts with a chemical mechanical polishing (CMP) process. In one embodiment, a Damascene process may be used to fotin the contact layer with a flat top surface. In accordance with various embodiments, to reduce contact resistance, a metal different from the conventional copper, such as nickel, palladium, chromium, or metal alloy, can be used. While FIG. 4E shows one possible process to make contact with graphene, an alternative way to make contact with graphene is to deposit graphene first, then pattern the contact by a lift-off process.

FIG. 4F is a cross-sectional view of the photonic device 400-6, where a first photonic material sublayer 441 is formed on the contact layer 436, at one of the various stages of fabrication, according to some embodiments of the present disclosure. This may be performed by depositing a first two-dimensional material, e.g. graphene, onto the contact layer 436 according to a first pattern to until the first photonic material sublayer 441. In various embodiments, the single atomic graphene sublayer 441 can be formed by: either a chemical vapor deposition (CVD) process or a transfer from a graphene coated copper foil at wafer or chip level. A low temperature rapid thermal annealing can be used to reduce the contact resistance to the graphene. For example, the first photonic material sublayer 441 may be annealed at a temperature between 200 degrees Celsius and 300 degrees Celsius.

FIG. 4G is a cross-sectional view of the photonic device 400-7, where a first dielectric sublayer 442 is formed on the first photonic material sublayer 441, at one of the various stages of fabrication, according to some embodiments of the present disclosure. This may be performed by: depositing a first dielectric material onto the first photonic material sublayer 441 to form the first dielectric sublayer 442; and etching the first dielectric sublayer 442 to form a second pattern. The thin dielectric sublayer 442 is deposited to protect the graphene 441 and/or to insulate two graphene sublayers for a high-speed modulator. The first dielectric material may comprise at least one of: aluminum oxide, silicon nitride, or silicon oxide. According to the second pattern, the first dielectric sublayer 442 has two portions 442-1, 442-2 separated by a trench 443 on and exposing one of the contacts 436.

FIG. 4H is a cross-sectional view of the photonic device 400-8, where a second photonic material sublayer 445 is formed on the first dielectric sublayer 442, at one of the various stages of fabrication, according to some embodiments of the present disclosure. This may be performed by depositing a second two-dimensional material, e.g. graphene, onto the first dielectric sublayer 442 according to the second pattern to form the second photonic material sublayer 445. To be specific, the second two-dimensional material is deposited partially onto the dielectric portion 442-1, and deposited into the trench 443 and onto the exposed contact 436. In various embodiments, the single atomic graphene sublayer 445 can be formed by: either a chemical vapor deposition (CVD) process or a transfer from a graphene coated copper foil at wafer or chip level. A low temperature rapid thermal annealing can be used to reduce the contact resistance to the graphene. For example, the second photonic material sublayer 445 may be annealed at a temperature between 200 degrees Celsius and 300 degrees Celsius.

FIG. 4I is a cross-sectional view of the photonic device 400-9, where a second dielectric sublayer 446 is formed on the second photonic material sublayer 445, at one of the various stages of fabrication, according to some embodiments of the present disclosure. This may be performed by: depositing a second dielectric material onto the second photonic material sublayer 445 and the first dielectric sublayer 442 to form the second dielectric sublayer 446. The second dielectric material may comprise at least one of: aluminum oxide, silicon nitride, or silicon oxide. As such, a photonic material layer 440 is formed to comprise: the first photonic material sublayer 441, the first dielectric sublayer 442, the second photonic material sublayer 445, and the second dielectric sublayer 446. After this stage, the graphene sublayers 441, 445 and their contacts 436 are sealed by the dielectric material.

FIG. 4J is a cross-sectional view of the photonic device 400-10, where an optical routing layer 450 is deposited onto the second dielectric sublayer 446, at one of the various stages of fabrication, according to some embodiments of the present disclosure. This may be performed by: depositing silicon oxide onto the second dielectric sublayer 446, and polishing the silicon oxide based on a chemical mechanical polishing or planarization process.

FIG. 4K is a cross-sectional view of the photonic device 400-11, where a plurality of etched regions 452 is formed in the optical routing layer 450, at one of the various stages of fabrication, according to some embodiments of the present disclosure. This may be performed by: defining a geometric pattern from a photomask to the optical routing layer 450 based on photolithography; and etching the silicon oxide in the optical routing layer 450 to form etched regions 452 with a structure pattern.

FIG. 4L is a cross-sectional view of the photonic device 400-12, where a plurality of waveguides 455 is formed in the etched regions 452, at one of the various stages of fabrication, according to some embodiments of the present disclosure. This may be performed by: depositing, according to the structure pattern, an optical routing material into the etched regions 452 and onto the photonic material layer 440; and polishing the optical routing material to form the optical routing layer 450 comprising a plurality of waveguides 455. The optical routing material may comprise at least one of: silicon (Si) nitride, aluminum oxide, polycrystalline-Si, amorphous-Si, Si-rich silicon oxide, or an organic material like SU8. In one embodiment, a same material is used in the plurality of waveguides 455, the first dielectric sublayer 442, and the second dielectric sublayer 446. After this stage, optical routing structures are formed in the optical routing layer 450 to transfer optical signals inside the chip or to the chip edge for an inter-chip communication. In one embodiment, the stages in FIG. 4J to FIG. 4L can be performed based on a Damascene process to pattern the optical routing structures.

FIG. 4M is a cross-sectional view of the photonic device 400-13, where an optical cladding layer 460 is formed on the optical routing layer 450, at one of the various stages of fabrication, according to some embodiments of the present disclosure. This may be performed by: depositing silicon oxide with a thickness of at least one micrometer on the optical routing layer 450 to form the optical cladding layer 460.

FIG. 4N is a cross-sectional view of the photonic device 400-14, where a plurality of metal vias 462 is formed through the optical cladding layer 460, at one of the various stages of fabrication, according to some embodiments of the present disclosure. This may be performed by: depositing silicon oxide with a thickness of at least one micrometer on the optical routing layer 450 to form the optical cladding layer 460. The plurality of metal vias 462 may be formed by: defining a geometric pattern from a photomask to the optical cladding layer 460 based on photolithography; etching the optical cladding layer 460, the optical routing layer 450, and the photonic material layer 440 to form etched regions with a pattern; depositing a metal material, according to the pattern, into the etched regions to form the plurality of metal vias 462 extending through the optical cladding layer 460, the optical routing layer 450, and the photonic material layer 440 and onto some of the contacts 436. Each of the plurality of metal vias 462 may be formed by multiple sub-stages, with an inter-level metal layer 464 formed between two adjacent sub-stages.

FIG. 4O is a cross-sectional view of the photonic device 400-15, where a top metal routing layer 470 is formed on the optical cladding layer 460, at one of the various stages of fabrication, according to some embodiments of the present disclosure. The top metal routing layer 470 may be formed by depositing a metal material like copper, aluminum, silver, etc., onto the optical cladding layer 460, with a polishing process. With the optical cladding layer 460 being thick enough to isolate the optical routing in the plurality of waveguides 455, metal routings, such as power distribution layers, can be patterned in the top metal routing layer 470. As such, the optical cladding layer 460 also serves as an optical isolation layer between the optical routing layer 450 and the top metal routing layer 470.

FIG. 4P is a cross-sectional view of the photonic device 400-16, where contact openings 480 are formed on the top metal routing layer 470, at one of the various stages of fabrication, according to some embodiments of the present disclosure. The contact openings 480 may be formed based on a deposition process, an etching process, and a clean process.

Figure 5:
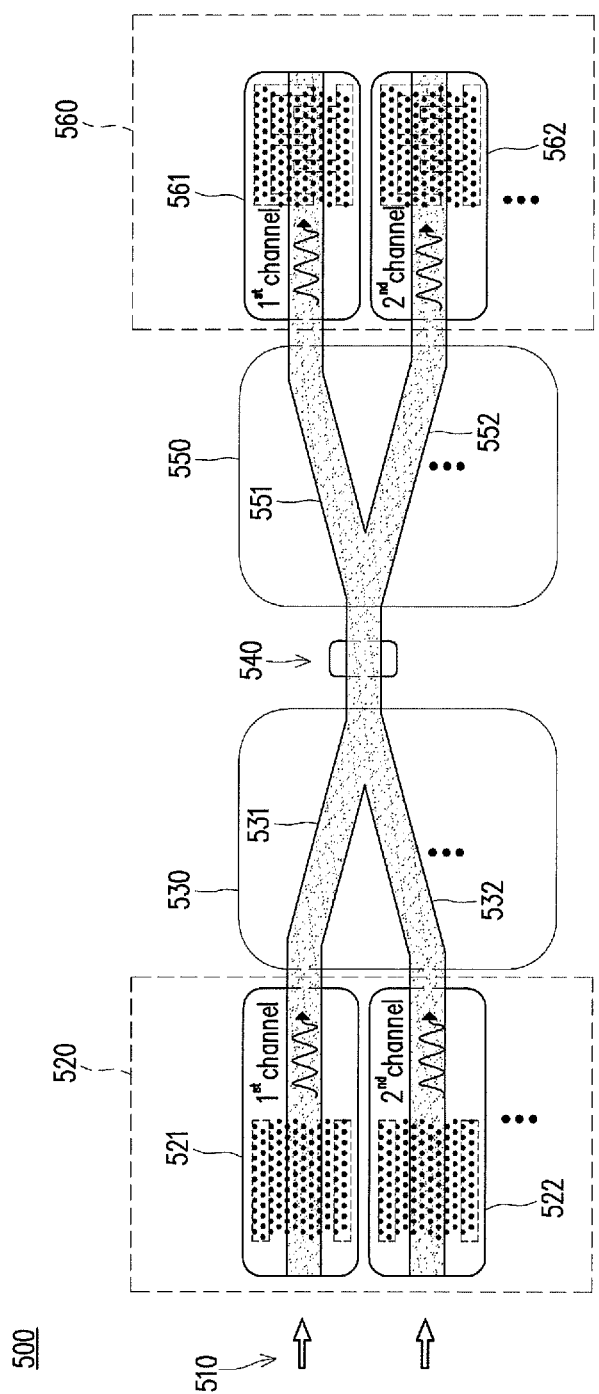
FIG. 5 illustrates an exemplary optical communication system, in accordance with some embodiments of present disclosure.

FIG. 5 illustrates an exemplary optical communication system 500, in accordance with some embodiments of present disclosure. As shown in FIG. 5, the optical communication system 500 includes: an electrical to optical convertor 520 and an optical to electrical convertor 560. In various embodiments, each of the electrical to optical convertor 520 and the optical to electrical convertor 560 may have a structure similar to that shown in FIGS. 1-4. For example, each of the electrical to optical convertor 520 and the optical to electrical convertor 560 may comprise: a bulk silicon substrate, a plurality of metal layers on the bulk silicon substrate, a plurality of waveguides over the plurality of metal layers, and a photonic material layer comprising graphene located below a top surface of each of the plurality of waveguides. In one embodiment, the photonic material layer comprises graphene located below a bottom surface of at least one of the plurality of waveguides. In another embodiment, the photonic material layer comprises graphene located within, e.g. at a center of, at least one of the plurality of waveguides. The optical communication system 500 may include high speed devices based on graphene, which may be deposited or transferred on wafer level or die level.

As shown in FIG. 5, the electrical to optical convertor 520 is configured for converting electrical signals into optical signals, based on a continuous wave light input 510, where the plurality of waveguides 531, 532 in the electrical to optical convertor 520 forms first N channels 521, 522 for transmitting optical signals. Similarly, the plurality of waveguides 551, 552 in the optical to electrical convertor 560 forms second N channels 561, 562 for transmitting optical signals. The optical to electrical convertor 560 is configured for converting optical signals into electrical signals.

As shown in FIG. 5, the optical communication system 500 further includes: an optical coupler 540 coupled between the electrical to optical convertor 520 and the optical to electrical convertor 560; a signal multiplexer 530 coupled between the electrical to optical convertor 520 and the optical coupler 540; and a signal de-multiplexer 550 coupled between the optical coupler 540 and the optical to electrical convertor 560. The optical coupler 540 may be an edge coupler or a grating coupler configured to realize an inter-chip optical communication.

The signal multiplexer 530 is configured for multiplexing the first N channels 531, 532 into a single channel. The signal de-multiplexer 550 is configured for de-multiplexing the single channel into the second N channels 551, 552. In various embodiments, different optical signal multiplexing (and de-multiplexing) schemes can be used, e.g. wavelength multiplexing, space multiplexing, mode multiplexing, etc. to further boost the information stream density.

Figure 6:
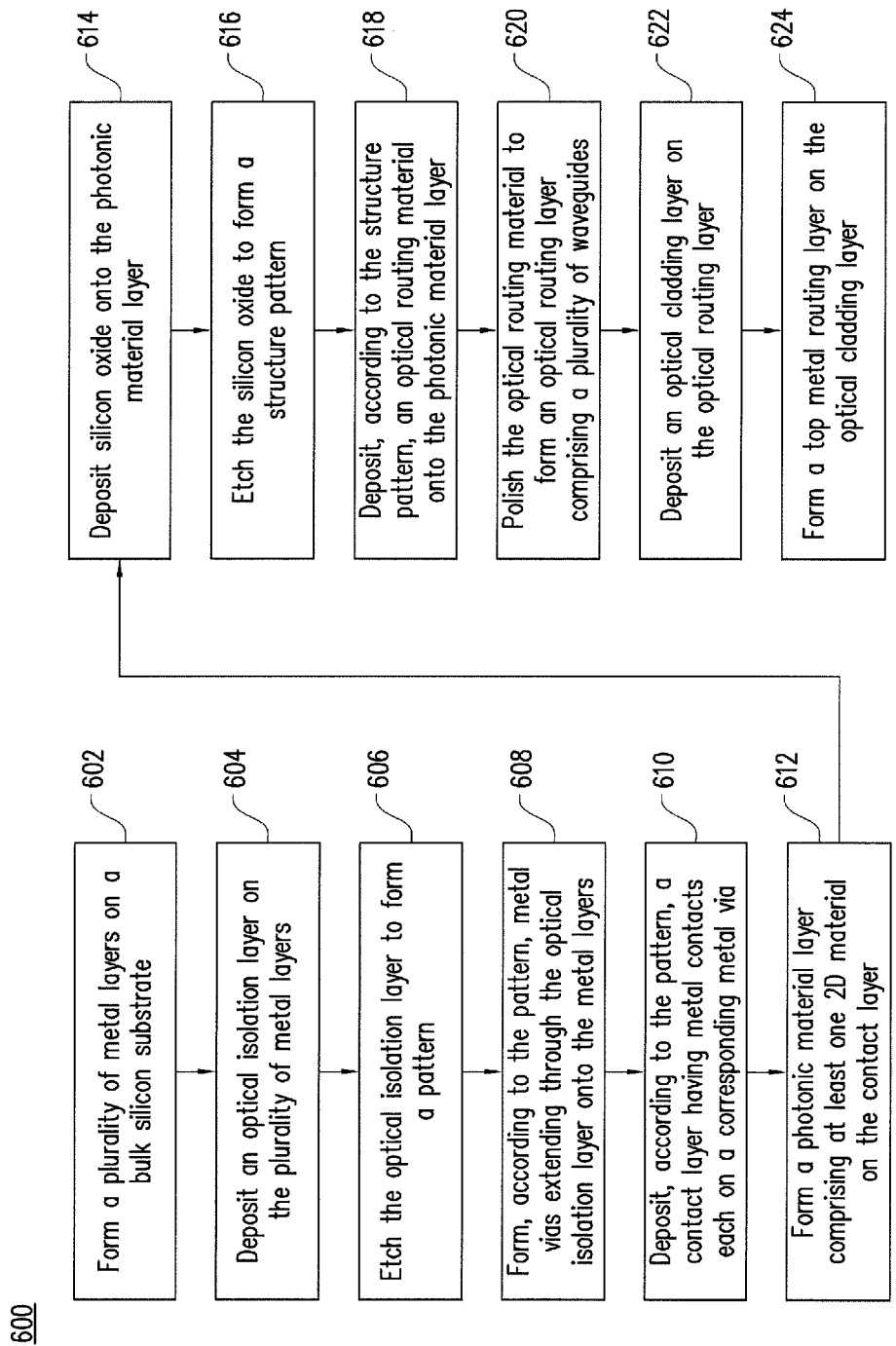
FIG. 6 illustrates an exemplary method for forming a photonic device, in accordance with some embodiments of the present disclosure.

FIG. 6 illustrates an exemplary method 600 for forming a photonic device, in accordance with some embodiments of the present disclosure. The method 600 begins at operation 602, where a plurality of metal layers is formed on a bulk silicon substrate. At operation 604, an optical isolation layer is deposited on the plurality of metal layers. At operation 606, the optical isolation layer is etched to form a pattern. According to the pattern, metal vias extending through the optical isolation layer are formed at operation 608 onto the metal layers. According to the pattern, a contact layer is deposited at operation 610, wherein the contact layer comprises metal contacts each of which is deposited on a corresponding one of the metal vias. At operation 612, a photonic material layer comprising at least one two-dimensional (2D) material is formed on the contact layer.

At operation 614, silicon oxide is deposited onto the photonic material layer. At operation 616, the silicon oxide is etched to form a structure pattern. According to the structure pattern, an optical routing material is deposited at operation 618 onto the photonic material layer. At operation 620, the optical routing material is polished to form an optical routing layer comprising a plurality of waveguides. At operation 622, an optical cladding layer is deposited on the optical routing layer. At operation 624, a top metal routing layer is formed on the optical cladding layer. The order of the operations shown in FIG. 6 may be changed according to different embodiments of the present disclosure.

Figure 7:
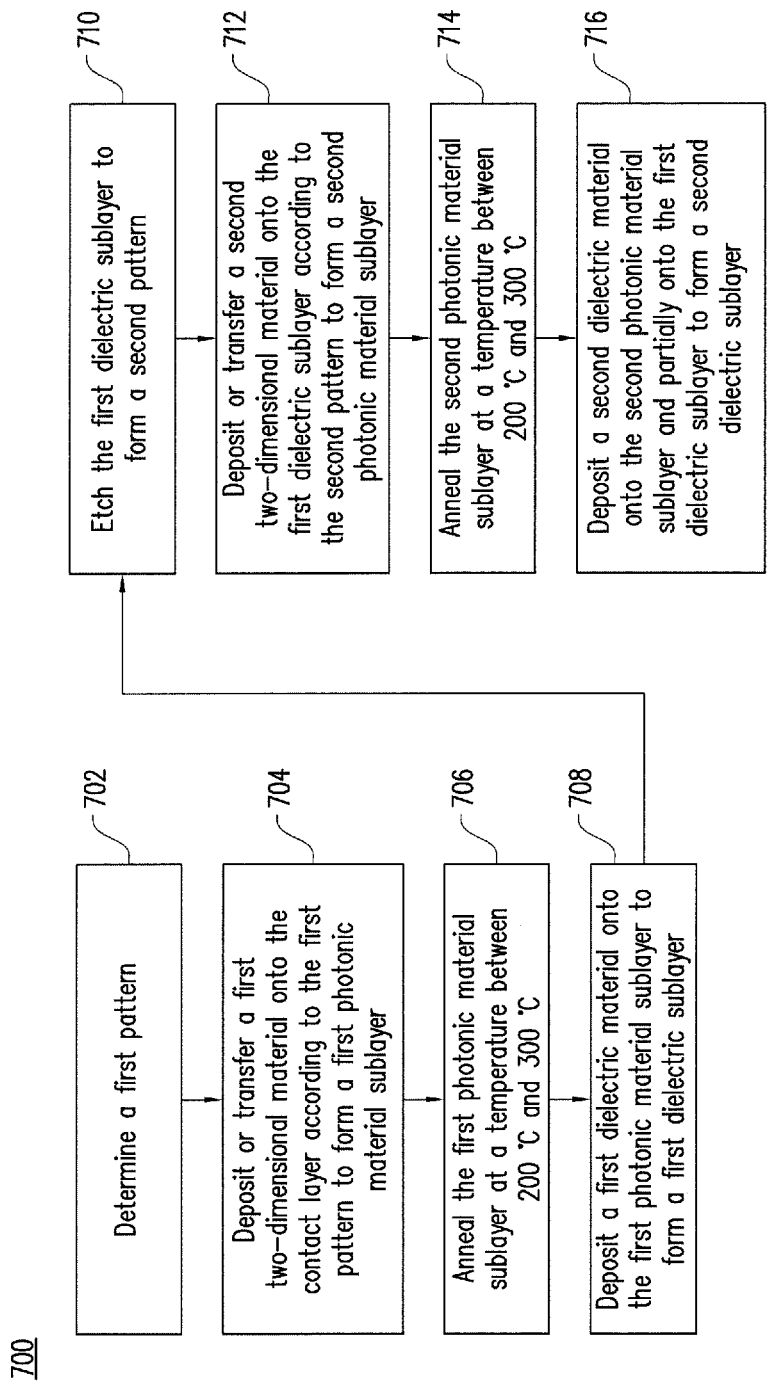
FIG. 7 illustrates an exemplary method for forming a photonic material layer in a photonic device, in accordance with some embodiments of the present disclosure.

FIG. 7 illustrates an exemplary method 700 for forming a photonic material layer in a photonic device, in accordance with some embodiments of the present disclosure. In one embodiment, the method 700 may be used to perform the operation 612 in the method 600 shown in FIG. 6.

The method 700 begins at operation 702, where a first pattern is determined. At operation 704, a first two-dimensional material, e.g. graphene, is deposited or transferred onto the contact layer according to the first pattern to form a first photonic material sublayer. At operation 706, the first photonic material sublayer is annealed at a temperature between 200° C. and 300° C. At operation 708, a first dielectric material is deposited onto the first photonic material sublayer to form a first dielectric sublayer.

At operation 710, where the first dielectric sublayer is etched to form a second pattern. At operation 712, a second two-dimensional material, e.g. graphene, is deposited or transferred onto the first dielectric sublayer according to the second pattern to form a second photonic material sublayer. At operation 714, the second photonic material sublayer is annealed at a temperature between 200° C. and 300° C. At operation 716, a second dielectric material is deposited onto the second photonic material sublayer and partially onto the first dielectric sublayer to form a second dielectric sublayer. The order of the operations shown in FIG. 7 may be changed according to different embodiments of the present disclosure.

In one embodiment, a photonic device is disclosed. The photonic device includes: a substrate; a plurality of metal layers on the substrate; a photonic material layer comprising graphene over the plurality of metal layers; and an optical routing layer comprising a waveguide on the photonic material layer.

In another embodiment, an optical communication system is disclosed. The optical communication system includes: an electrical to optical convertor; and an optical to electrical convertor. Each of the electrical to optical convertor and the optical to electrical convertor comprises: a bulk silicon substrate, a plurality of metal layers on the bulk silicon substrate, a plurality of waveguides over the plurality of metal layers, and a photonic material layer comprising graphene located below a top surface of each of the plurality of waveguides.

In yet another embodiment, a method for forming a photonic device is disclosed. The method includes: forming a plurality of metal layers on a bulk silicon substrate; depositing a contact layer comprising a plurality of metal contacts over the plurality of metal layers; forming a photonic material layer comprising at least one two-dimensional material on the contact layer; and depositing, according to a structure pattern, an optical routing material onto the photonic material layer to form an optical routing layer comprising a plurality of waveguides.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic device, comprising:
a substrate;
a metal layer formed on the substrate;
a contact layer comprising at least one contact formed over the metal layer;
a photonic material layer disposed on the contact layer; and
a waveguide on the photonic material layer, wherein
the photonic material layer comprises: a first photonic material sublayer and a second photonic material sublayer, wherein the second photonic material sublayer comprises a top portion and a bottom portion, wherein the top portion is above the first photonic material sublayer, and the bottom portion is at a same horizontal level with the first photonic material sublayer, and
the first photonic material sublayer is formed above and in direct contact with the contact layer, and the second photonic material sublayer is formed above and in direct contact with the contact layer.

2. The photonic device of claim 1, wherein:
the substrate is made of bulk silicon.

3. The photonic device of claim 1, further comprising:
an optical isolation layer formed on the metal layer.

4. The photonic device of claim 3, wherein the optical isolation layer comprises silicon oxide with a thickness of at least one micrometer.

5. The photonic device of claim 3, further comprising:
at least one metal via extending through the optical isolation layer and onto the metal layer, wherein the at least one metal via comprises at least one inter-level metal layer over the metal layer.

6. The photonic device of claim 5, wherein the at least one contact is formed on and in contact with a corresponding one of the at least one metal via.

7. The photonic device of claim 6, wherein the at least one contact comprises at least one of: nickel, palladium, or chromium.

8. The photonic device of claim 6, wherein the photonic material layer comprises:
at least one graphene sublayer comprising graphene; and
at least one dielectric sublayer comprising a dielectric material.

9. The photonic device of claim 6, wherein the waveguide and the photonic material layer form at least one of: a modulator or a photodetector.

10. The photonic device of claim 1, further comprising:
an optical routing layer;
an optical cladding layer on the optical routing layer, wherein the optical cladding layer comprises silicon oxide with a thickness of at least one micrometer; and
a top metal routing layer on the optical cladding layer.

11. An optical communication system, comprising:
an electrical to optical convertor; and
an optical to electrical convertor, wherein each of the electrical to optical convertor and the optical to electrical convertor comprises:
a substrate,
a metal layer formed on the substrate,
a contact layer comprising at least one contact over the metal layer,
at least one waveguide over the contact layer, and
a photonic material layer located below a top surface of the at least one waveguide, wherein
the photonic material layer comprises: a first photonic material sublayer, and a second photonic material sublayer, wherein the second photonic material sublayer comprises a top portion and a bottom portion, wherein the top portion is above the first photonic material sublayer, and the bottom portion is at a same horizontal level with the first photonic material sublayer, and
the first photonic material sublayer is formed on and in direct contact with the contact layer, and the second photonic material sublayer is formed on and in direct contact with the contact layer.

12. The optical communication system of claim 11, wherein:
the electrical to optical convertor is configured for converting electrical signals into optical signals, based on a continuous wave light input;
the at least one waveguide in the electrical to optical convertor forms first N channels for transmitting optical signals;
the at least one waveguide in the optical to electrical convertor forms second N channels for transmitting optical signals; and
the optical to electrical convertor is configured for converting optical signals into electrical signals.

13. The optical communication system of claim 12, further comprising:
an optical coupler that is coupled between the electrical to optical convertor and the optical to electrical convertor and is configured for an inter-chip optical communication;
a signal multiplexer that is coupled between the electrical to optical convertor and the optical coupler, and configured for multiplexing the first N channels into a single channel; and
a signal de-multiplexer that is coupled between the optical coupler and the optical to electrical convertor, and configured for de-multiplexing the single channel into the second N channels.

14. The optical communication system of claim 11, wherein:
the photonic material layer comprises graphene located below a bottom surface of the at least one waveguide.

15. The optical communication system of claim 11, wherein:
the photonic material layer comprises graphene located at a center of the at least one waveguide.

16. A method for forming a photonic device, comprising:
forming at least one metal layer on a substrate;
depositing a contact layer comprising a plurality of metal contacts over the at least one metal layer;
forming a photonic material layer comprising at least one two-dimensional material on the contact layer, wherein the photonic material layer comprises: a first photonic material sublayer and a second photonic material sublayer, wherein the second photonic material sublayer comprises a top portion and a bottom portion, wherein the top portion is above the first photonic material sublayer, and the bottom portion is at a same horizontal level with the first photonic material sublayer,
the first photonic material sublayer is formed on and in direct contact with the contact layer, and the second photonic material sublayer is formed on and in direct contact with the contact layer; and
forming an optical routing layer on the photonic material layer, the optical routing layer comprising a plurality of waveguides.

17. The method of claim 16, further comprising:
depositing an optical isolation layer on the at least one metal layer, wherein the optical isolation layer comprises silicon oxide with a thickness of at least one micrometer;
etching the optical isolation layer to form a pattern; and
forming at least one metal via extending through the optical isolation layer and onto the at least one metal layer, wherein each of the at least one metal via comprises at least one inter-level metal layer over the at least one metal layer, wherein:
at least one of the plurality of metal contacts is deposited on and in contact with a corresponding one of the at least one metal via.

18. The method of claim 16, wherein forming the photonic material layer comprises:
depositing a first two-dimensional material onto the contact layer according to a first pattern to form the first photonic material sublayer;
annealing the first photonic material sublayer at a temperature between 200 degrees Celsius and 300 degrees Celsius;
depositing a first dielectric material onto the first photonic material sublayer to form a first dielectric sublayer;
etching the first dielectric sublayer to form a second pattern;
depositing a second two-dimensional material onto the first dielectric sublayer according to the second pattern to form the second photonic material sublayer;
annealing the second photonic material sublayer at a temperature between 200 degrees Celsius and 300 degrees Celsius; and
depositing a second dielectric material onto the second photonic material sublayer and the first dielectric sublayer to form a second dielectric sublayer.

19. The method of claim 18, further comprising:
depositing silicon oxide onto the second dielectric sublayer; and
etching the silicon oxide to form a structure pattern according to which an optical routing material is deposited onto the second dielectric sublayer, wherein:
the optical routing material comprises at least one of: silicon (Si) nitride, aluminum oxide, polycrystalline-Si, amorphous-Si, Si-rich silicon oxide, or an organic material, and
the optical routing material is same as the first dielectric material and the second dielectric material.

20. The method of claim 16, further comprising:
depositing an optical cladding layer on the optical routing layer, wherein the optical cladding layer comprises silicon oxide with a thickness of at least one micrometer; and
forming a top metal routing layer on the optical cladding layer.

\* \* \* \* \*